United States Patent
Itonaga

(10) Patent No.: US 7,301,881 B2
(45) Date of Patent: Nov. 27, 2007

(54) OPTICAL PICKUP DEVICE

(75) Inventor: Makoto Itonaga, Yokohama (JP)

(73) Assignee: Victor Company of Japan, Limited, Yokohama (JP)

(*) Notice: Subject to any disclaimer, the term of this patent is extended or adjusted under 35 U.S.C. 154(b) by 566 days.

(21) Appl. No.: 11/007,444

(22) Filed: Dec. 9, 2004

(65) Prior Publication Data
US 2005/0128920 A1    Jun. 16, 2005

(30) Foreign Application Priority Data
Dec. 12, 2003    (JP)    ............................ P2003-414859

(51) Int. Cl.
*G11B 7/00* (2006.01)
(52) U.S. Cl. ................................. 369/112.23
(58) Field of Classification Search ...................... None
See application file for complete search history.

(56) References Cited

U.S. PATENT DOCUMENTS

| | | | |
|---|---|---|---|
| 5,526,338 A * | 6/1996 | Hasman et al. ................. | 369/94 |
| 6,275,461 B1 * | 8/2001 | Yoo et al. .............. | 369/112.01 |
| 6,836,378 B2 * | 12/2004 | Sugi et al. .................... | 359/719 |
| 6,930,974 B2 * | 8/2005 | Kunimatsu ............. | 369/112.23 |
| 7,012,876 B2 * | 3/2006 | Hendriks et al. ....... | 369/112.24 |
| 2005/0007931 A1 * | 1/2005 | Sakamoto et al. ...... | 369/112.01 |
| 2005/0025028 A1 * | 2/2005 | Hirai et al. ............ | 369/112.05 |
| 2005/0063283 A1 * | 3/2005 | Ori et al. ................ | 369/112.08 |

FOREIGN PATENT DOCUMENTS

| | | |
|---|---|---|
| JP | 06-082725 | 3/1994 |
| JP | 2002-236253 | 8/2002 |
| JP | 2003-270525 | 9/2003 |
| JP | 2003-272213 | 9/2003 |

OTHER PUBLICATIONS

Koike, K., et al., "Phase Shift Element for Blu-ray Disk/DVD Compatibility", *Technical Digest for ODS*, WA6, (2003).

* cited by examiner

*Primary Examiner*—William R. Korzuch
*Assistant Examiner*—Peter Vincent Agustin
(74) *Attorney, Agent, or Firm*—The Nath Law Group; Jerald L. Meyer; Stanley N. Protigal

(57) ABSTRACT

First and second phase function curves are respectively obtained based on first and second phase functions with a wavelength having the same value as a reference wavelength $\lambda 1$ of a first laser light being determined as a designed wavelength $\lambda$, a phase shift element then has an inner circular side tiered phase difference pattern portion formed in annular shapes in an inner circular area on one surface thereof based on the first phase function curve and an outer circular side tiered phase difference pattern portion formed in annular shapes in an outer circular area outside the inner circular side tiered phase difference pattern portion based on the second phase function curve. A tier pitch of tiers of the inner circular side tiered phase difference pattern portion is set to a height corresponding to a phase difference of approximately $1\lambda$ and, on the other hand, a tier pitch of tiers of the outer circular side tiered phase difference pattern portion is set to a height corresponding to a phase difference of approximately $m\lambda$ (where m is a natural number which does not include 0) or a height corresponding to a phase difference of approximately $m\lambda$ by changing a value of m in accordance with each tier.

5 Claims, 11 Drawing Sheets

INNER CIRCULAR SIDE
LONGITUDINAL ABERRATION
IN Blu-ray Disc

OUTER CIRCULAR SIDE
LONGITUDINAL ABERRATION
IN Blu-ray Disc

LONGITUDINAL ABERRATION IN DVD

US 7,301,881 B2

OPTICAL PICKUP DEVICE

BACKGROUND OF THE INVENTION

1. Field of the Invention

The present invention relates to an optical pickup device comprising at least: an objective lens whose numerical aperture (NA) is not less than 0.75; and a phase shift element which corrects a spherical aberration generated due to a difference in substrate thickness between first and second optical recording mediums when the objective lens is used in cases where the first and second optical recording mediums having different substrate thicknesses are selectively recorded or reproduced by using first and second laser lights having different wavelengths.

2. Description of the Related Art

In general, optical recording mediums such as a discoid optical disc or a card-shaped optical card are often used since they can record information signals of, e.g., video information, sound information or computer data on tracks spirally or concentrically formed on a transparent substrate with a high density, and access a desired track at a high speed when reproducing recorded tracks.

Although an optical disc which serves as this type of optical recording medium, e.g., a DVD (Digital Versatile Disc) or the like has been already commercially available, a Blu-ray Disc which can record or reproduce information signals with a very higher density than the DVD has been recently vigorously developed in order to achieve a higher density with respect to the optical disc.

The above-described DVD records or reproduces information signals on a signal surface placed at a position apart from a laser beam incidence surface by approximately 0.6 mm by applying a laser beam obtained by narrowing down a laser light whose wavelength is approximately 650 mm by an objective lens whose numerical aperture (NA) is approximately 0.6. At this time, a recording capacity of the DVD is approximately 4.7 GB (gigabytes) on one side when a diameter of a disc substrate is 12 cm.

On the other hand, the above-described Blu-ray Disc has been developed so that it can record or reproduce information signals on a signal surface placed at a position apart from a laser beam incidence surface by approximately 0.1 mm by applying a laser beam obtained by narrowing down a laser light whose wavelength is not more than 450 nm by an objective lens whose numerical aperture (NA) is not less than 0.75. At this time, a recording capacity of the Blu-ray Disc is approximately 25 GB (gigabytes) on one side when a diameter of a disc substrate is 12 cm.

Meanwhile, with advance of the development of the Blu-ray Disc, there has been developed an optical pickup device which can perform recording or reproduction while assuring downward compatibility between the Blu-ray Disc whose recording density is an extra-high density and the DVD whose recording density is lower than that of the Blu-ray Disc by using one objective lens (e.g., Japanese Patent Application Laid-open No.2002-236253 (pp.57-58, FIG. 31), and Phase Shift Element for Blu-ray Disc/DVD Compatibility, Katsuhiro Koike et., al., Technical digest for ODS 2003, WA6).

Further, an optical pickup device which can correct a chromatic aberration with respect to the Blu-ray Disc has been developed (e.g., Japanese Patent Application Laid-open No.2003-272213 (pp.5-6, FIG. 2), and Japanese Patent Application Laid-open No.2003-270525 (p.6, FIG. 3)).

Furthermore, an optical pickup device which can correct a chromatic aberration with respect to a general optical disc has been also developed (e.g., Japanese Patent Application Laid-open No.hei6(1994)-82725 (p.2; FIG. 1)).

FIG. 1 is a view schematically showing an optical system of an optical pickup device according to Conventional Example 1. FIG. 2 is a view schematically showing an optical system of an optical pickup device according to Conventional Example 2. FIG. 3 is a view schematically showing an optical system of an optical pickup device according to Conventional Example 3. FIG. 4 is a view schematically showing an optical system of an optical pickup device according to Conventional Example 4. FIG. 5 is a view schematically showing an optical system of an optical pickup device according to Conventional Example 5.

First, an optical pickup device 110 according to Conventional Example 1 shown in FIG. 1 is disclosed in the Japanese Patent Application Laid-Open No.2000-236253. The device will be briefly described with reference to the document. The optical pickup device 110 according to Conventional Example 1 is configured so that a first optical disc 101 having a transparent substrate whose thickness is 0.1 mm (e.g., a next-generation high-density optical disc using a blue laser) and a second optical disc 102 having a transparent substrate whose thickness is 0.6 mm (e.g., a DVD) can be selectively applied.

The optical pickup device 110 according to Conventional Example 1 comprises: a first semiconductor laser 111 which emits a first laser light (a blue laser light) having a wavelength of approximately 400 nm in accordance with the first optical disc (e.g., a next-generation high-density optical disc) 101; a second semiconductor laser 112 which emits a second laser light (a red laser light) having a wavelength of approximately 650 nm in accordance with the second optical disc (e.g., a DVD); first and second beam splitters 113 and 114; a collimator lens 116 which is movable in an optical axis direction by a one-dimensional actuator 115; a ¼ wave plate 117; an aperture 118; an objective lens 120 which has a numerical aperture NA of 0.7 or above in order to form images of the first and second laser lights on the first and second optical discs by a two-dimensional actuator 119 and has a diffraction annular lens formed on at least one surface; and a cylindrical lens 121 and a photodetector 122 which detect return lights from the first and second discs 101 and 102.

Moreover, respective divergent light beams exiting from the first and second semiconductor lasers 111 and 112 are selectively condensed on information recording surfaces 111a and 102a of the first and second optical discs 101 and 102 through the first and second beam splitters 113 and 114, the collimator lens 116 and the ¼ wave plate 117 and the aperture 118, thereby forming respective spots. In this example, in cases where there are errors in substrate thicknesses of the first and second optical discs, where there are errors in respective oscillation wavelengths due to manufacture errors of the first and second semiconductor lasers 111 and 112, or where there are errors in thicknesses of the lenses constituting the condenser optical system, a generated spherical aberration is corrected by movement of the collimator lens 116.

Additionally, since the objective lens 120 converges a light beam from the first semiconductor laser 111 within a diffraction limit in an image side numerical aperture NA1, information recorded on the first optical disc 101 at a high density can be reproduced. On the other hand, since the objective lens 120 converges a light beam from the second semiconductor laser 112 within a diffraction limit in an image side numerical aperture NA2, information recorded on the second optical disc 102 can be reproduced. Further, when converging a light beam from the second semiconductor laser 112 on the information recording surface 102a of the second optical disc 102, since a light beam which passes through an area from the image side numerical aperture NA1 to the counterpart NA2 is formed as a flare component by an effect of the diffraction annular lens formed on at least one surface of the objective lens 120, the light beam passing through the area from the image side numerical aperture NA1 to the counterpart NA2 does not form a spot on the information recording surface 102a of the second optical disc 102 even if the whole light beam from the second semiconductor laser 112 is caused to pass through the aperture 118 determined by NA1. Therefore, aperture switching means for NA1 and NA2 does not have to be provided.

An optical pickup device 130 according to Conventional Example 2 shown in FIG. 2 is disclosed in the above reference by Katsuhiro Koike et. al. Giving a brief description in conjunction with the reference by Katsuhiro Koike et. al., in the optical pickup device 130 according to Conventional Example 2, a phase shift element (PSE) 132 and an objective lens 133 whose numerical aperture (NA) is 0.85 are attached in a lens holder 131, a Blu-ray Disc compatible with a wavelength of 405 nm and a DVD compatible with a wavelength of 650 nm can be selectively applied, and a spherical aberration generated due to a difference in substrate thickness between the Blu-ray Disc and the DVD can be corrected by the phase shift element 132.

In this example, the phase shift element 132 (PSE) has a tiered phase difference pattern portion 132a formed on an inner portion thereof, and a flat portion 132b is formed on a circular portion around the tiered phase difference pattern portion 132a.

A first laser light having a wavelength of 405 nm is transmitted through the tiered phase difference pattern portion 132a and the flat portion 132b of the phase shift element 132 as it is with respect to the Blu-ray Disc so that the first laser light is condensed on the Blu-ray Disc. On the other hand, a second laser light having a wavelength of 650 nm is transmitted through the tiered phase difference pattern portion 132a only of the phase shift element 132 with respect to the DVD so that the second laser light is condensed on the DVD by using the objective lens 133 while correcting a spherical aberration by the tiered phase difference pattern portion 132a.

An optical pickup device 140 according to Conventional Example 3 shown in FIG. 3 is a device disclosed in Japanese Patent Application Laid-open No.2003-272213. Giving a brief description in conjunction with this publication, the optical pickup device 140 according to Conventional Example 3 comprises: a beam expander 141 comprising a concave lens 141A and a convex lens 141B; a triplet 142 which is formed by attaching a concave lens 142A, a convex lens 142B and a concave lens 142C and serves as chromatic aberration correcting means; and an objective lens 143 whose numerical aperture is not less than 0.7. This optical pickup device 140 can correct a spherical aberration and a chromatic aberration with respect to a Blu-ray Disc 101 for a laser light L whose wavelength is approximately 403 nm.

In this example, the beam expander 141 changes the parallelism of a light by adjusting a gap between the two lenses 141A and 141B, thereby correcting a spherical aberration of the objective lens 143. Furthermore, the triplet 142 corrects an error component in a focal direction generated by a chromatic aberration of the objective lens 143.

An optical pickup device 150 according to Conventional Example 4 shown in FIG. 4 is disclosed in Japanese Patent Application Laid-open No.2003-270525. Giving a brief description in conjunction with this publication, the optical pickup device 150 according to Conventional Example 4 comprises: a beam expander 151 comprising a concave lens 151 and a Fresnel lens 151B; and an objective lens 152 whose numerical aperture is not less than 0.7, and can correct a spherical aberration and a chromatic aberration with respect to a Blu-ray Disc 101 for a laser light L whose wavelength is approximately 405 nm.

In this example, the beam expander 151 changes the parallelism of a light by adjusting a gap between the two lenses 151A and 151B, thereby correcting a spherical aberration of the objective lens 152. Furthermore, an analog blaze 151Ba (or a tiered blaze) is formed to the Fresnel lens 151B in the beam expander 151, and functions as a convex lens with respect to the concave lens 151A. A focal distance of the Fresnel lens 151B is set so that an error component in a focal direction generated by a chromatic aberration of the objective lens 152 can be corrected.

An optical pickup device 160 according to Conventional Example 5 shown in FIG. 5 is disclosed in Japanese Patent Application Laid-open No.hei6(1994)-82725. Giving a brief description in conjunction with this publication, the optical pickup device 160 according to Conventional Example 5 comprises: a chromatic aberration correction element 161 whose flat surface vertical to an optical axis is formed as a concentric annular zone having a tiered shape on at least one of a light incidence end surface 161a and a light projection end surface 161b; and an objective lens 162, and can correct a chromatic aberration with respect to an optical disc 103 by using the single chromatic aberration correction element 161.

Meanwhile, in the optical pickup device 110 according to Conventional Example 1, the first optical disc 101 having a transparent substrate whose thickness is 0.1 mm and the second optical disc 102 having a transparent substrate whose thickness is 0.6 mm can be selectively applied by the objective lens 120 whose numerical aperture NA is not less than 0.7 and which has the diffraction annular lens formed on at least one surface, but a pitch of the diffraction annular lens formed on at least one surface of the objective lens 120 is narrow, and machining of the objective lens 120 is hard, which may possibly adversely affect the lens performance.

Furthermore, in the optical pickup device 130 according to Conventional Example 2, although the Blu-ray Disc compatible with a wavelength of 405 nm and the DVD compatible with a wavelength of 650 nm can be selectively applied by the phase shift element 132 and the objective lens 133 whose numerical aperture NA is 0.85, a spherical aberration is corrected with respect to the second laser light by the tiered phase difference pattern portion 132a formed on the inner circular portion of the phase shift element 132. However, in regard to the first laser light which is transmitted through the tiered phase difference pattern portion 132a formed on the inner portion and the flat portion 132b formed on the outer circular portion as it is, if a wavelength error is generated, the correction of a spherical aberration with respect to the Blu-ray Disc becomes lax since the outer circular portion is flat.

Moreover, in the optical pickup device 140 according to Conventional Example 3, although a spherical aberration and a chromatic aberration can be corrected with respect to the Blu-ray Disc 101 by the beam expander 141, the triplet 142 and the objective lens 143 whose numerical aperture is not less than 0.7, assuring the downward compatibility between the Blu-ray Disc 101 and the DVD (not shown) to be recorded or reproduced is not considered. Additionally, since the triplet 142 which serves as the chromatic aberration correcting means must be designed in such a manner that it can correct an epaxial chromatic aberration excessively in the entire optics, a curvature radius of the attached surface becomes small, and machining is difficult. Furthermore, in cases where a spherical aberration is corrected by the beam expander 141, changing a gap in the beam expander 141 can suffice, but a time required to correct the spherical aberration becomes long.

Moreover, in the optical pickup device 150 according to Conventional Example 4, since a spherical aberration and a chromatic aberration can be corrected by the beam expander 151 only which has the blaze, the equivalent performance can be obtained with respect to the Blu-ray Disc 101 even if the number of components is reduced to be less than that in Conventional Example 3. However, assuring the downward compatibility between the Blu-ray Disc 101 and the DVD (not shown) to be recorded or reproduced is not considered. Additionally, when the analog blaze 151Ba (or the tiered blaze) is formed to the Fresnel lens 151B in the beam expander 151, a pitch becomes narrow, and machining is thereby difficult.

Further, in the optical pickup device 160 according to Conventional Example 5, since a chromatic aberration can be corrected with respect to the optical disc 103 by the chromatic aberration correction element 161 formed into a tiered shape, this device can be likewise applied to the extra-high density Blu-ray Disc, but assuring the downward compatibility between the Blu-ray Disc and the DVD to be recorded or reproduced is not considered.

SUMMARY OF THE INVENTION

Thus, there has been demanded an optical pickup device which can assure the downward compatibility between a first optical recording medium (e.g., a Blu-ray Disc) whose recording density is an extra-high density and a second optical recording medium (e.g., a DVD) whose recording density is lower than that of the first light recording medium by using one objective lens in order to record or reproduce information, has less fluctuations in spherical aberrations when a wavelength change occurs, leads the design of a chromatic aberration correction element which is simultaneously used for the Blu-ray Disc to facilitate manufacture, and involves no increase in the number of elements.

To achieve this aim, there is provided an optical pickup device which selectively records or reproduces a first optical recording medium, and a second optical recording medium having a recording density lower than that of the first optical recording medium and a substrate thickness larger than that of the first optical recording medium, comprising: a first laser light source which emits a first laser light whose wavelength is not more than 450 nm in accordance with the first optical recording medium; a second laser light source which emits a second laser light whose wavelength is longer than that of the first laser light in accordance with the second optical recording medium; an objective lens which has a numerical aperture (NA) set to 0.75 or above for the first optical recording medium, in which at least one of respective surfaces thereof backing onto each other is formed into an aspherical surface, and which converges the first and second laser lights on the respective signal surfaces of the first and second optical recording mediums; and a phase shift element which is provided between the first and second laser light source side and the objective lens and corrects a spherical aberration generated due to a difference in substrate thickness between the first and second optical recording mediums, wherein first and second phase function curves are respectively obtained based on first and second phase functions with a wavelength having the same value as a reference wavelength $\lambda1$ of the first laser light being determined as a designed wavelength $\lambda$, then the phase shift element has an inner circular side tiered phase difference pattern portion formed in annular shapes in an inner circular area of one surface thereof based on the first phase function curve and has an outer circular side tiered phase difference pattern portion formed in annular shapes in an outer circular area outside the inner circular side tiered phase difference pattern portion based on the second phase function curve, and a tier pitch of tiers of the inner circular side tiered phase difference pattern portion is set to a height corresponding to a phase difference of approximately $1\lambda$ and, on the other hand, a tier pitch of tiers of the outer circular side tiered phase difference pattern portion is set to a height corresponding to a phase difference of approximately $m\lambda$ (where m is a natural number which does not include 0) or a height corresponding to a phase difference of approximately $m\lambda$ by changing a value of m in accordance with each tier.

According to the optical pickup device of the present invention, when the optical pickup device comprises at least the first and second laser light sources which respectively emit first and second laser lights to the first and second optical recording mediums, the objective lens whose numerical aperture is not less than 0.75, and the phase shift element which corrects a spherical aberration generated due to a difference in substrate thickness between the first and second optical recording mediums, the first and second phase function curves are obtained based on the first and second phase functions with a wavelength having the same value as the reference wavelength $\lambda1$ of the first laser light being determined as the designed wavelength $\lambda$, then the phase shift element has the inner circular side tiered phase difference pattern portion formed in annular shapes in the inner circular area on one surface thereof based on the first phase function curves and has the outer circular side tiered phase difference pattern portion formed in annular shapes in the outer circular area outside the inner circular side tiered phase difference pattern portion based on the second phase function curve. Further, a tier pitch of tiers of the inner circular side tiered phase difference pattern portion is set to a height corresponding to a phase difference which is approximately $1\lambda$ and, on the other hand, a tier pitch of tiers of the outer circular side tiered phase difference pattern portion is set to a height corresponding to a phase difference which is approximately $m\lambda$ (where m is a natural number which does not include 0) or a height corresponding to a phase difference which is approximately $m\lambda$ by changing a value of m in accordance with each tier. Therefore, a spherical aberration with respect to the second laser light L2 can be corrected by the inner circular side tiered phase difference pattern portion, and a chromatic aberration can be corrected with respect to the first laser light L1 by the outer circular side tiered phase difference pattern portion. Accordingly, it is possible to provide the optical pickup device with the phase shift element having the excellent performance with respect to the first and second recording mediums.

In a preferred embodiment according to the present invention, an offset is given between an overall height of the outer circular side tiered phase difference pattern portion of the phase shift element and an overall height of the inner circular side tiered phase difference pattern portion of the same by adding to the second phase function a phase difference which is close to an average value of a wavefront generated by the first phase function and which is a substantially integral multiple of the designed wavelength λ, thereby reducing a phase difference between an average wavefront of a light exiting from the inner circular side tiered phase difference pattern portion and a wavefront of a light exiting from the outer circular side tiered phase difference pattern portion when a wavelength changes in the vicinity of the reference wavelength of the first laser light.

According to this embodiment, a wavefront aberration generated in the optical system can be improved with respect to the first laser light L1.

In the preferred embodiment according to the present invention, wherein a second laser light aperture limiting portion which limits a numerical aperture (NA) of the second laser light with respect to the objective lens when the tier pitch of the tiers of the outer circular side tiered phase difference pattern portion is set to substantially mλ=substantially 1λ is formed on a reverse side with respect to the outer circular side tiered phase difference pattern portion of the phase shift element.

According to this embodiment, in cases where both the tier pitch of tiers of the inner circular side tiered phase difference pattern portion and that of the outer circular side tiered phase difference pattern portion are set to approximately 1λ, the second laser light can be prevented from being transmitted by the second laser light aperture limiting portion when restricting the numerical aperture (NA) of the second laser light with respect to the objective lens.

In the preferred embodiment according to the present invention, the optical pickup device further comprises a chromatic aberration correction element which is arranged between the first laser light source side and the phase shift element and corrects a chromatic aberration.

According to this embodiment, since a radius of the attached surface of the chromatic aberration correction element formed by attaching the concave lens, the convex lens and the concave lens can be set large, manufacture of the chromatic aberration correction element can be facilitated, and the optical pickup device having the excellent performance with respect to the first and second recording mediums can be provided.

In the preferred embodiment according to the present invention, the chromatic aberration correction element is arranged to act on the first laser light only.

According to this embodiment, since the chromatic aberration correction element is arranged in such a manner that it acts on the first laser light only, information of the first recording medium can be excellently recorded or reproduced.

The nature, principle and utility of the invention will become more apparent from the following detailed description when read in conjunction with the accompanying drawings.

DETAILED DESCRIPTION OF THE PREFERRED EMBODIMENT

An embodiment of an optical pickup device according to the present invention will now be described in detail hereinafter with reference to FIGS. 6 to 22.

An optical pickup device according to the present invention is characterized in that, when assuring downward compatibility between a first optical recording medium (e.g., a Blu-ray Disc) whose recording density is an extra-high density and a second optical recording medium (e.g., a DVD) whose recording density is lower than that of the first optical recording medium by using one objective lens in order to record or reproduce information, the optical pickup device comprises at least: an objective lens which is designed to be compatible with the first optical recording medium based on next-generation optical disc standards and has a numerical aperture (NA) of 0.75 or above; a chromatic aberration correction element which corrects a chromatic aberration with respect to the first optical recording medium; and a phase shift element which corrects a spherical aberration generated due to a difference in substrate thickness between the first and second optical recording mediums, the design of the chromatic aberration correction element being led to facilitation of production by providing the phase shift element, the phase shift element having an inner circular side tiered phase difference pattern portion formed in a circular shape based on a first phase function curve obtained by a first phase function and having an outer circular side tiered phase difference pattern portion formed in a circular shape based on a second phase function curve obtained by a second phase function as will be described later being capable of correcting the spherical aberration with respect to the first and second optical recording medium to be canceled out or reduced.

Figure 6:
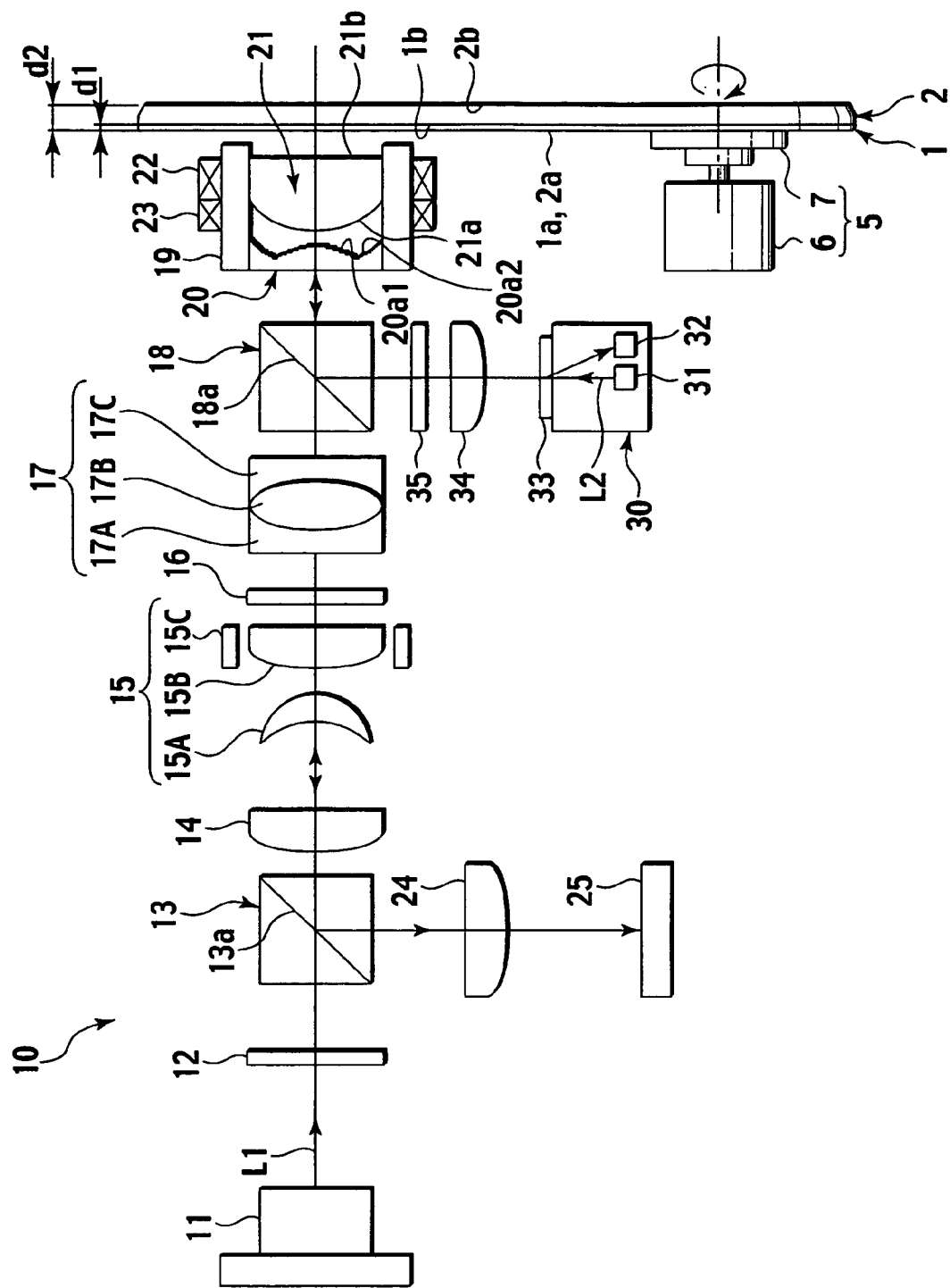
FIG. 6 is a view showing an entire structure of an optical pickup device according to the present invention.

FIG. 6 is a diagram showing the whole constitution of an optical pickup device according to the present invention.

As shown in FIG. 6, an optical pickup device 10 according to the present invention was developed to enable selective application of a first optical recording medium 1 which records or reproduces an information signal at an extra-high density on or from a signal surface 1b with a small substrate thickness by using a first laser light L1 whose reference wavelength $\lambda 1$ is not more than 450 nm, a second optical recording medium 2 which records or reproduces an information signal at a high density on or from a signal surface 2b whose substrate thickness is larger than that of the signal surface 1b of the first optical recording medium 1 by using a second laser light L2 whose reference wavelength $\lambda 2$ is approximately 650 nm longer than the reference wavelength $\lambda 1$ of the first laser light L1, and a combined optical recording medium in which either of the first and second laser lights L1, L2 is incident upon a common laser beam incidence surface and the respective signal surfaces 1b, 2b of the first and second optical recording mediums 1, 2 are combined and integrally stacked.

It is to be noted that although not shown herein, a total disc substrate thickness of the combined optical recording medium in which the respective signal surfaces 1b, 2b of the first and second optical recording mediums 1, 2 are combined is set to approximately 1.2 mm. The first and second optical recording mediums 1 and 2 will be individually described hereinafter in detail. Since the combined optical recording medium is an application, the description is omitted.

Moreover, in the following description, an application to a disc-shaped optical disc as the first and second optical recording mediums 1, 2 will be described, but the present invention is not limited to this, and may also be applied to a card-shaped optical recording medium.

Moreover, the first and second optical recording mediums 1, 2 are selectively attached onto a turntable 7 secured to a shaft of a spindle motor 11 rotatably disposed in the optical disc driving apparatus 5.

Here, in the Blu-ray Disc 1 which is the first optical recording medium, a disc substrate thickness d1 between a laser beam incidence surface 1a and the signal surface 1b is set to be thin in a range of approximately 0.05 mm to 0.15 mm based on next-generation optical disc standards. A reinforcing plate (not shown) is bonded onto the surface so that a total thickness is set to be large, and the total thickness is, for example, approximately 1.2 mm. It is to be noted that in the following description, the first optical recording medium is represented by the Blu-ray Disc 1.

Moreover, in a DVD (Digital Versatile Disc) 2 which is the second optical recording medium, a disc substrate thickness d2 between a laser beam incidence surface 2a and the signal surface 2b is set to 0.6 mm, which is larger than the thickness of the Blu-ray Disc 1, based on DVD standards. A reinforcing plate (not shown) is bonded onto the surface so that the total thickness is, for example, approximately 1.2 mm. It is to be noted that in the following description, the second optical recording medium is represented by the DVD 2.

It is to be noted that in this embodiment, the respective disc substrate thicknesses d1, d2 of the Blu-ray Disc 1 and the DVD 2 are set, for example, to 0.1 mm and 0.6 mm, respectively.

Moreover, the optical pickup device 10 according to the present invention is disposed movably in a diametric direction of the Blu-ray disc 1 or the DVD 2 below the laser beam incidence surface 1a of the Blu-ray disc 1 or the laser beam incidence surface 2a of the DVD 2.

In the optical pickup device 10 according to the present invention, a first laser light source (hereinafter referred to as the blue semiconductor laser) 11 which emits a first laser light L1 having a reference wavelength $\lambda 1$ of 450 nm or less for the Blu-ray Disc 1, and a second laser light source (hereinafter referred to as the red semiconductor laser) 31 in a DVD integrated device 30 which emits a second laser light L2 having a reference wavelength $\lambda 2$ of around 650 nm for the DVD 2 are disposed.

It is to be noted that, in this embodiment, the reference wavelength $\lambda 1$ of the first laser light L1 emitted from the blue semiconductor laser 11 is set, for example, to 408 nm. On the other hand, it is assumed that the reference wavelength $\lambda 2$ of the second laser light L2 emitted from the red semiconductor laser 31 is set, for example, to 655 nm.

First, a blue semiconductor laser 11 side for the Blu-ray Disc 1 will be described. The first laser light L1 emitted from the blue semiconductor laser 11 is a divergent light of linear polarization. This divergent light enters a diffraction grating 12, and divided into three beams (which will be referred to as three beams hereinafter) comprising a 0-order diffraction light and $\pm 1^{st}$ order diffraction lights in accordance with a pitch and an inclination angle of irregular gratings (not shown) formed in this diffraction grating 12. Then, the three beams enter a polarized beam splitter 13.

It is to be noted that although the three beams are generated by the diffraction grating 12 in this embodiment, a structure having no diffraction grating 12 is also possible. In this case, it is good enough to allow the first laser light L1 emitted from the blue semiconductor laser 11 to directly enter the polarized beam splitter 13 as one beam.

The polarized beam splitter 13 has a transmission/reflection dielectric multilayered film 13a having the polarizability formed thereto in order to transmit the three beams from the diffraction grating 12 therethrough and reflect a later-described reflected light from the Blu-ray Disc 1 thereon so that a direction of the light is changed by substantially 90°.

Thereafter, the three beams obtained from the first laser light L1 transmitted through the transmission/reflection dielectric multilayered film 13a in the polarized beam splitter 13 are converted into a parallel light by a collimator lens 14 to enter spherical aberration correcting means 15.

The spherical aberration correcting means 15 corrects a spherical aberration generated by an optical system arranged between the blue semiconductor laser 11 and the Blu-ray Disc 1 with irregularities in the disc substrate thickness d1 of the Blu-ray Disc 1 or a wavelength error of the first laser light L1 emitted from the blue semiconductor laser 11, and comprises a concave lens (a negative lens) 15A provided on the blue semiconductor laser 11 side, a convex lens (a positive lens) 15B provided on a later-described objective lens 21 side and an actuator 15C which displaces the convex lens 15B along a direction of an optical axis. Additionally, the actuator 15C is used to displace the convex lens 15B in the direction of the optical axis with respect to the concave lens 15A so that a gap between the concave lens 15A and the convex lens 15B is controlled, the parallelism of the three beams entering the objective lens 21 is adjusted, and a spherical aberration due to a magnification error of the objective lens 21 is generated to be canceled out with any other spherical aberration, thereby performing a correction so that the spherical aberration becomes zero. It is to be noted that a method which displaces the concave lens (a negative lens) 15A in the direction of the optical axis with respect to the convex lens 15B may be adopted.

It is to be noted that although the combination of the concave lens 15A, the convex lens 15B and the actuator 15C is used as the spherical aberration correcting means in this embodiment, a wavefront modulation element using a liquid crystal element or the like may be applied instead.

Thereafter, when the three beams obtained from the first laser light L1 transmitted through the spherical aberration correcting means 15 pass through a wavelength plate 16, the three beams obtained from the first laser light L1 are converted into a circularly polarized light by giving a phase difference of a substantially ¼ wavelength (90°) to polarization components corresponding to a phase advancing axis and a phase delaying axis of the wavelength plate, and then the converted light enters the chromatic aberration correction element 17.

The chromatic aberration correction element 17 is formed by attaching a concave lens 17A, a convex lens 17B and a concave lens 17C, and has a function which corrects a chromatic aberration with respect to the first laser light L1.

Figure 1:
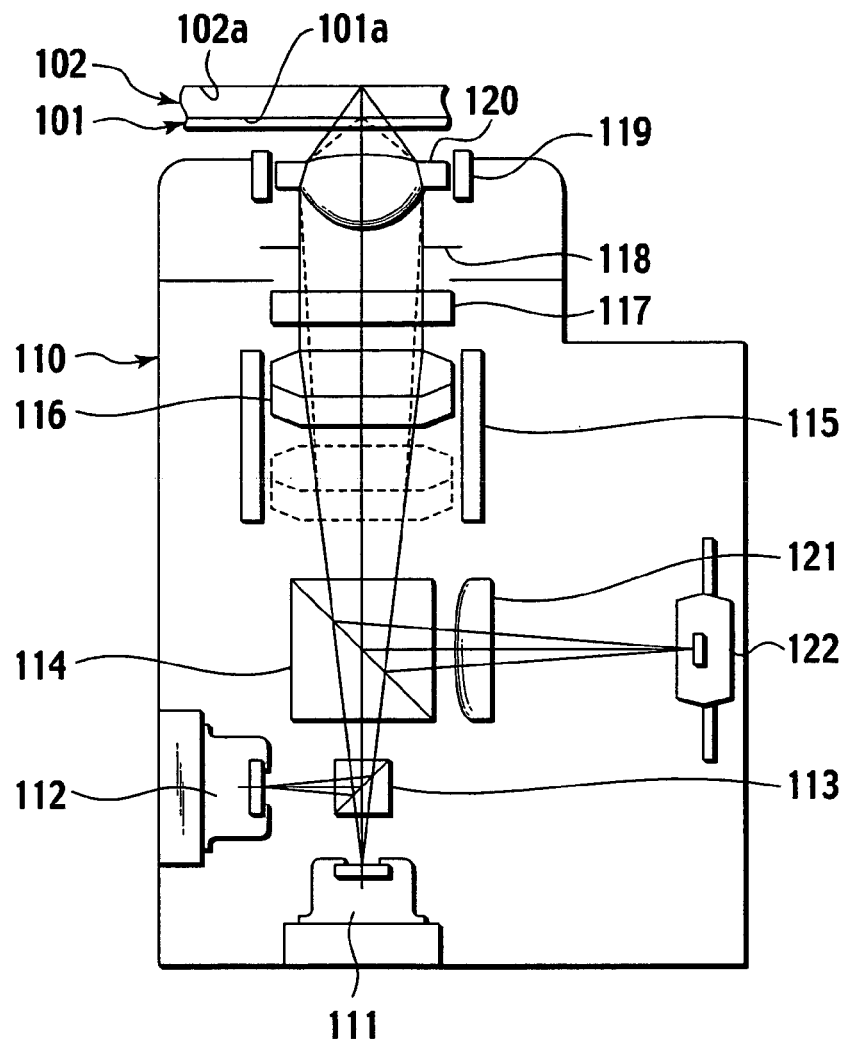
FIG. 1 is a view schematically showing an optical system of an optical pickup device according to Conventional Example 1.
Figure 2:
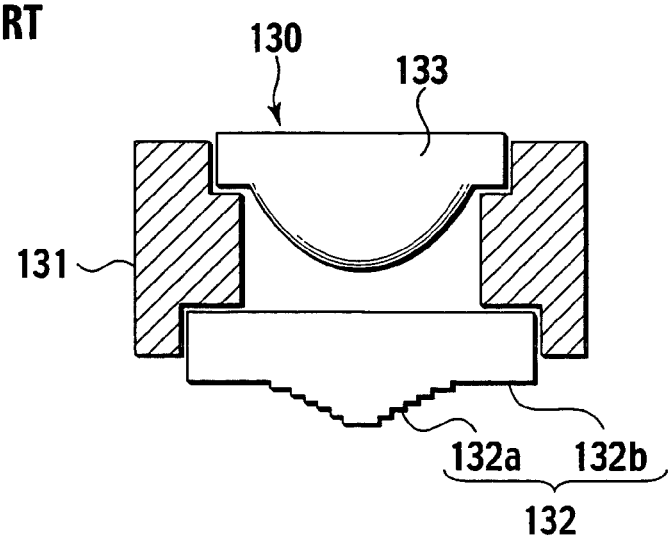
FIG. 2 is a view schematically showing an optical system of an optical pickup device according to Conventional Example 2.
Figure 3:
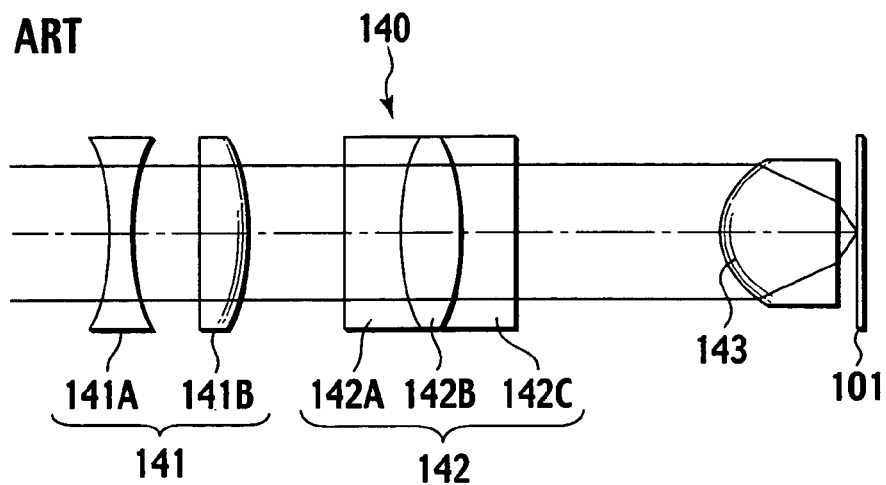
FIG. 3 is a view schematically showing an optical system of an optical pickup device according to Conventional Example 3.
Figure 4:
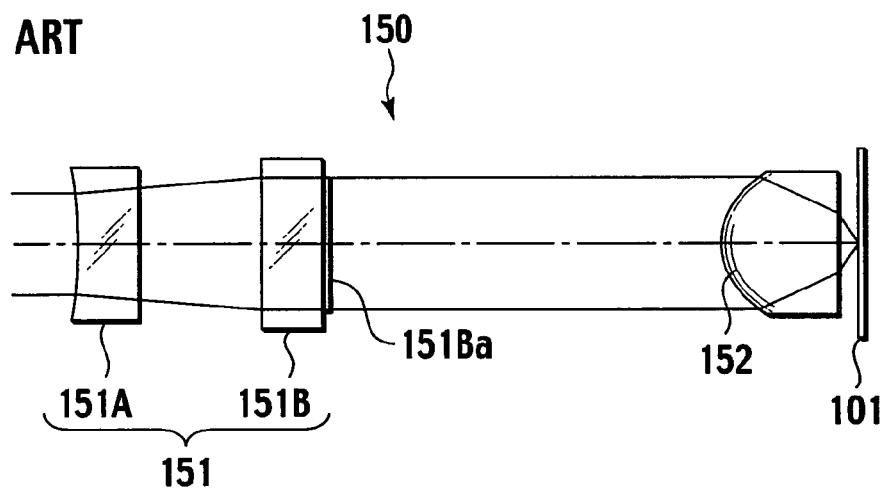
FIG. 4 is a view schematically showing an optical system of an optical pickup device according to Conventional Example 4.
Figure 5:
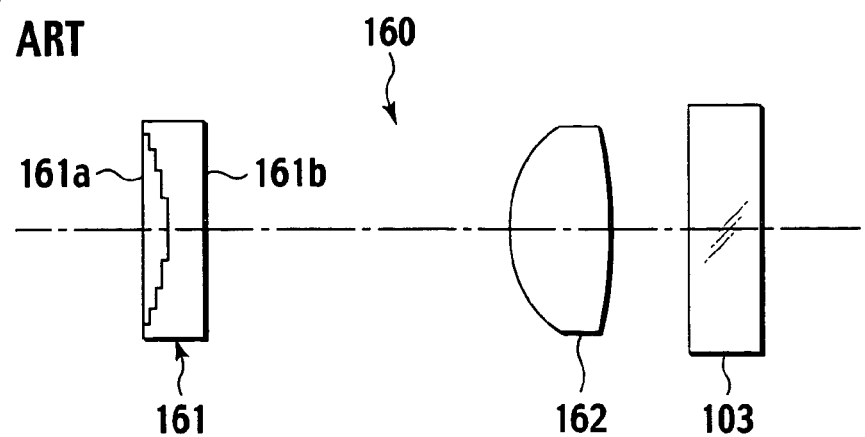
FIG. 5 is a view schematically showing an optical system of an optical pickup device according to Conventional Example 5.

It is to be noted that the chromatic aberration correction element 17 is used in this embodiment, but it is possible to apply instead a chromatic aberration correction element which has a flat surface vertical to an optical axis formed into a tiered shape as a concentric circular zone on at least one of the light incidence end surface and the light projection end surface described in Conventional Example 5 with reference to FIG. 5. Further, this concentric annular zone may be formed on a refraction surface (a curved surface).

It is to be noted that since a chromatic aberration is not generated if the reference wavelength λ1 of the first laser light L1 is 408 nm, it is good enough to measure a chromatic aberration with respect to the Blu-ray Disc 1 by using the blue semiconductor laser 11 in which the first laser light L1 has a wavelength of, e.g., 411 nm.

Furthermore, the three beams obtained from the first laser light L1 transmitted through the chromatic aberration correction element 17 pass through a dichroic prism 18. This dichroic prism 18 has a transmission/reflection dichroic film 18a having the wavelength selectivity formed thereto in order to transmit the first laser light L1 exiting from the blue semiconductor laser 11 therethrough and, on the other hand, reflect the second laser light L2 exiting from the red semiconductor laser 31 thereon so that a direction of the light is changed by substantially 90°.

Then, the three beams obtained from the first laser light L1 transmitted through the transmission/reflection dichroic film 18a in the dichroic prism 18 advance straight as the parallel beam in a phase shift element 20 attached at a lower part in the lens holder 19 and enter the objective lens 21 attached at an upper part in the lens holder 19. The first laser beam (three beams) narrowed down by this objective lens 21 is incident on the laser incidence surface 1a of the Blu-ray Disc 1 and condensed on the signal surface 1b.

In this example, the phase shift element 20 comprises an inner circular side tiered phase difference pattern portion 20a1 formed in a circular shape in an inner circular area on an upper surface (one surface) side based on a first phase function curve obtained from a first phase function and an outer circular side tiered phase difference pattern portion 20a2 formed in an annular shape in a peripheral area outside the inner circular side tiered phase difference pattern portion 20a based on a second phase function curve obtained from a second phase function as will be described later, and it is attached in such a manner that its optical axis matches with that of the objective lens 21 in the lens holder 19. Furthermore, the first laser light L1 exiting from the blue semiconductor laser 11 is transmitted through the inner circular side tiered phase difference pattern portion 20a1 and the outer circular side tiered phase difference pattern portion 20a2 of the phase shift element 20 as the parallel light, and then the first laser light L1 is allowed to enter the objective lens 21.

It is to be noted that the phase shift element 20 constitutes a primary part of the embodiment, and a shape of the phase shift element 20 and an operation with respect to the first laser light L1 by the phase shift element 20 will be described later.

Moreover, a numerical aperture of the objective lens 21 is set to 0.75 or more for the Blu-ray Disc, and at least one of first and second surfaces 21a, 21b backing onto each other is formed in an aspherical surface. In this embodiment, a single lens which has a numerical aperture (NA) of 0.85 and aplanatic characteristics or characteristics close to the aplanat is used. It is to be noted that the aplanat means a lens which completely corrects a spherical aberration on the axis and satisfies sine conditions (conditions under which a coma aberration is not generated outside the axis).

Additionally, a focus coil 22 and a tracking coil 23 are integrally attached to an outer periphery of the lens holder 19, and the phase shift element 20 and the objective lens 21 are controlled integrally with the lens holder 19 in the focus direction and the tracking direction of the Blu-ray Disc 1 through a plurality of non-illustrated suspension wires secured to an outer periphery of the lens holder 19.

It is to be noted that, in case of the DVD 2 which will be described later, the phase shift element 20 and the objective lens 21 are likewise controlled integrally with the lens holder 19 in the focus direction and the tracking direction of the DVD 2.

Then, the first laser beam (three beams) converged by the objective lens 21 is caused to enter from the laser beam incidence surface 1a of the Blu-ray Disc 1 to be condensed on the signal surface 1b, thereby performing reproducing, recording or deleting with respect to the signal surface 1b by the first laser beam.

Furthermore, a returning first reflected light by the first laser light L1 reflected by the signal surface 1b of the Blu-ray Disc 1 again enters the objective lens 21 in the reverse direction, passes through the phase shift element 20, the dichroic prism 18, the chromatic aberration correction element 17, the wavelength plate 16, the spherical aberration correcting means 15 and the collimator lens 14 in the mentioned order, and is reflected by the transmission/reflection dielectric multilayered film 13a having the polarizability in the polarized beam splitter 13 so that a direction of the returning first reflected light is changed by approximately 90°. Thereafter, this light is condensed on a first photodetector 25 through a cylindrical lens 24. Moreover, the first photodetector 25 detects a tracking error signal, a focus error signal and a main data signal obtained when reproducing information on the signal surface 1b of the Blu-ray Disc 1.

Next, a red semiconductor laser 31 side for the DVD 2 will be described. There is adopted an optical system which does not use the spherical aberration correcting means 15 and the chromatic aberration correcting means 17, which are utilized when recording or reproducing information to or from the Blu-ray Disc 1, in case of recording or reproducing information to or from the DVD 2.

It is to be noted that the spherical aberration correcting means 15 and the chromatic aberration correcting means 17 are arranged in the optical system only which records or reproduces information to or from the Blu-ray Disc 1, but the present invention is not restricted thereto, and it is possible to employ the optical system including the both means 15 and 17 even in case of recording or reproducing information to or from the DVD 2. In this case, the spherical aberration correcting means 15 may be configured so that an aberration can be reduced with respect to the second laser light L2, or an aberration can be reduced by appropriately setting the parallelism of the second laser light L2 which enters the spherical aberration correcting means 15 and the chromatic aberration correcting means 17.

Here, in the integrated device 30 for the DVD, the red semiconductor laser 31 and a second photodetector 32 disposed on the right side of the red semiconductor laser 31 are integrated on the non-illustrated semiconductor substrate, and a hologram element 33 is disposed above the red semiconductor laser 31.

It is to be noted that the integrated device 30 for the DVD is used in this embodiment, but the present invention is not restricted thereto, and a configuration in which the second laser light from the red semiconductor laser is divided by the beam splitter may be adopted although not shown.

In this example, the second laser light L2 exiting from the red semiconductor laser 31 is a divergent light of linear polarization, and this divergent light passes through the hologram element 33. Then, the second laser light L2 transmitted through the hologram element 33 is converted into a parallel light by the collimator lens 34, and this parallel light is transmitted through a phase plate 35 for the second laser light to be turned into a circularly polarized light. At this moment, when the second laser light L2 is transmitted through the phase plate 35 for the second laser light, this phase plate 35 converts the second laser light L2 into the circularly polarized light by giving a phase difference of $(\lambda 2)/4$ between its phase advancing axis and phase delaying axis.

Additionally, the second laser light L2 transmitted through the phase plate 35 is reflected on a transmission/reflection dichroic film 18a having the wavelength selectivity in a dichroic prism 18 so that its ray direction is changed by substantially 90°. Thereafter, an aperture is restricted with respect to the second laser light L2 by the phase shift element 20 so that a numerical aperture (NA) into the objective lens 21 is 0.6. The second laser light L2 is transmitted through the inner circular side tiered phase difference pattern portion 20a1 only of the phase shift element 20 in a substantially parallel light state, and enters the objective lens 21 while a spherical aberration is corrected.

It is to be noted that an operation of the phase shift element 20 with respect to the second laser light L2 will be described later.

Thereafter, the second laser beam converged by the objective lens 21 is allowed to enter from the laser beam incidence surface 2a of the DVD 2 so that it is condensed on the signal surface 2b, thereby performing reproducing, recording or deleting on the signal surface 2b of the DVD 2 by the second laser beam.

Moreover, a returning second reflected light obtained by the second laser beam reflected on the signal surface 2b of the DVD 2 again enters the objective lens 21 in the reverse direction, and is reflected by the transmission/refection dichroic film 18a in the dichroic prism 18 through the phase shift element 20 so that its ray direction is changed by approximately 90°. Then, the returning second reflected light passes through the phase plate 35 for the second laser light and the collimator lens 34 in the mentioned order, is diffracted by the hologram element 33, and condensed on the second photodetector 32. Additionally, the second photodetector 32 detects a tracking error signal, a focus error signal and a main data signal obtained when reproducing information on the signal surface 2b of the DVD 2.

Specifications of the main optical system in this embodiment will now be described in order.

First, the specification of the objective lens 21 is shown in Table 1.

TABLE 1

| Designed wavelength ($\lambda 1$) | 408 nm |
|---|---|
| Numerical aperture (NA) | 0.85 |
| Focal distance | 1.7647 mm |
| Incidence pupil diameter | 3.0 mm |
| Magnification | 0 time (parallel light) |

Table 2 shows a list of respective optical surface forming members including the chromatic aberration correction element 17, the phase shift element 20, the objective lens 21, the Blu-ray Disc 1 and the DVD 2.

TABLE 2

| Surface number | Optical surface forming member | Surface shape | Radius [mm] | Thickness [mm] | Material | Korenich constant |
|---|---|---|---|---|---|---|
| Object point | | | | −4000 (∞) | | |
| 1 | Chromatic aberration correction element | | ∞ | 0.7 | S-TIH11 | |
| 2 | | Spherical surface | 4.0 (∞) | 2.0 | S-LAH53 | |
| 3 | | Spherical surface | −4.0 (∞) | 0.7 | S-TIH11 | |
| 4 | | | ∞ | 5.0 | | |
| 5 | Phase shift element | | ∞ | 1.0 | BK7 | |
| 6 | | Phase surface | | 2.0 | | |
| 7 | Objective lens | Aspherical surface | 1.456112 | 2.472908 | NBF1 | −0.3426116 |
| 8 | | Aspherical surface | −5.152968 | 0.401066 (0.1566899) | | −897.5182 |
| 9 | Blu-ray Disc (DVD) | | ∞ | 0.1 (0.6) | polycarbonate | |
| Image surface | | | | | | |

In the table, numerical values in parentheses are values corresponding to the DVD.

Further, the following Table 3 shows each refractive index with respect to each wavelength of each material used for the chromatic aberration correction element, the phase shift element and the objective lens depicted in Table 2.

TABLE 3

| Material | Refractive index with respect to each wavelength | | |
|---|---|---|---|
| | 408 nm | 411 nm | 655 nm |
| S-TIH11 | 1.84027885 | 1.83845184 | — |
| S-LAH53 | 1.83962087 | 1.83860927 | — |
| BK7 | 1.52981667 | 1.52944626 | 1.51436212 |
| NBF1 | 1.76824132 | 1.76751615 | 1.73881356 |
| polycarbonate | 1.62109862 | 1.61992846 | 1.57995043 |

Next, the following Expression (1) shows a first phase function $\Phi(h)$ used when manufacturing the sixth surface (the inner circular side tiered phase difference pattern portion 20a1 of the phase shift element 20) in Table 2.

$$\Phi(h)=A_2 h^2 + A_4 h^4 + A_6 h^6 + A_8 h^8 \quad (1)$$

where $\Phi(h)$ is a phase function (its unit is radian);

$A_2$ to $A_8$ are phase function coefficients of second to eighth orders; and h is a height from the optical axis.

Furthermore, the following Table 4 shows an example of the phase function coefficients $A_2$ to $A_8$ in the first phase function $\Phi(h)$ mentioned above.

TABLE 4

| $A_2$ | 101.75319 |
| $A_4$ | −53.357502 |

TABLE 4-continued

| $A_6$ | −0.057451367 |
| $A_8$ | −6.8184552 |

Next, the following Expression (2) shows a second phase function $\Phi'(h)$ used when manufacturing the sixth surface (the outer circular side tiered phase difference pattern portion 20a2 of the phase shift element 20) in Table 2.

$$\Phi'(h)=A'_2 h^2 + A'_4 h^4 + A'_6 h^6 + A'_8 h^8 \quad (2)$$

where $\Phi'(h)$ is a phase function (its unit is radian);

$A'_2$ to $A'_8$ are phase function coefficients of second to eighth orders; and h is a height from the optical axis.

Furthermore, the following Table 5 shows an example of the phase function coefficients $A'_2$ to $A'_8$ in the second phase function $\Phi'(h)$ mentioned above.

TABLE 5

| $A'_2$ | 82.50131 |
| $A'_4$ | −58.716524 |
| $A'_6$ | 21.895327 |
| $A'_8$ | −8.50932 |

Next, when the seventh surface (the surface 21a facing the phase shift element 20 in the objective lens 21) in Table 2 on the laser light source side and the eighth surface (21b) in Table 2 which is the surface facing the Blu-ray Disc 1 or the DVD 2 in the objective lens 21 are formed in the aspherical surface, the aspherical surface is represented by the following Expression (3) which is a polynomial equation:

$$Z = \frac{Ch^2}{1+\sqrt{1-(1+K)C^2 h^2}} + B_4 h^4 + B_6 h^6 + B_8 h^8 + B_{10} h^{10} + B_{12} h^{12} \quad (3)$$

where Z is a distance from a vertex of the surface 21a or the surface 21b of the objective lens 21;

C is a curvature (1/curvature radius) of the surface 21a or the surface 21b;

h is a height from the optical axis of the objective lens 21;

K is a Korenich constant; and $B_4$ to $B_{12}$ are aspherical surface coefficients of fourth to twelfth orders.

When the polynomial equation of the above Expression (3) is used, the examples of the spherical surface coefficients $B_4$ to $B_{12}$ for forming the surface 21a (the seventh surface) of the objective lens 21 in the aspherical surface are shown in Table 6.

TABLE 6

| | |
|---|---|
| $B_4$ | −0.0010576748 |
| $B_6$ | −0.0016067112 |
| $B_8$ | −0.0018999083 |
| $B_{10}$ | 0.0011636962 |
| $B_{12}$ | 0.00053726704 |

Moreover, when the polynomial equation of the above Expression (3) is used, the examples of the aspherical surface coefficients $B_4$ to $B_{10}$ for forming the surface 21b (the eighth surface) of the objective lens 21 in the aspherical surface are shown in Table 7.

TABLE 7

| | |
|---|---|
| $B_4$ | 0.074253313 |
| $B_6$ | −0.26330886 |
| $B_8$ | 0.36249615 |
| $B_{10}$ | −0.18118911 |

Each optical surface forming member shown in Table 2 will now be described hereinafter with reference to FIG. 6 mentioned above and FIGS. 7 to 14.

Figure 7:
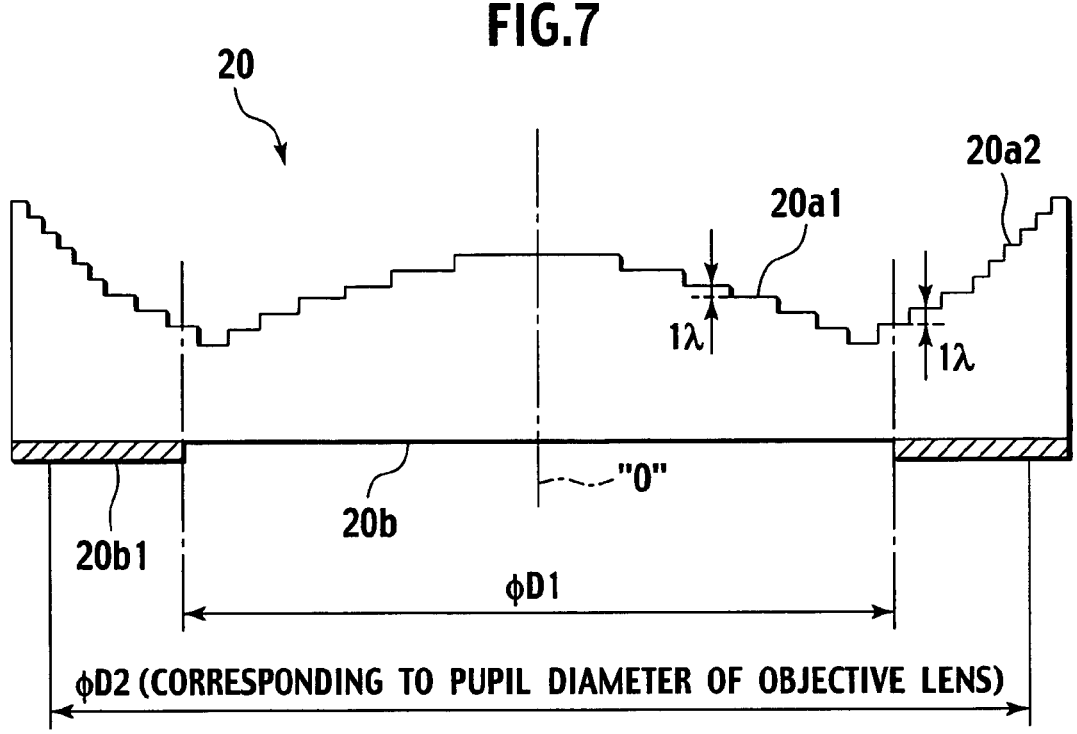
FIG. 7 is a vertical cross-sectional view showing in an enlarged manner the phase shift element depicted in FIG. 6.
Figure 8:
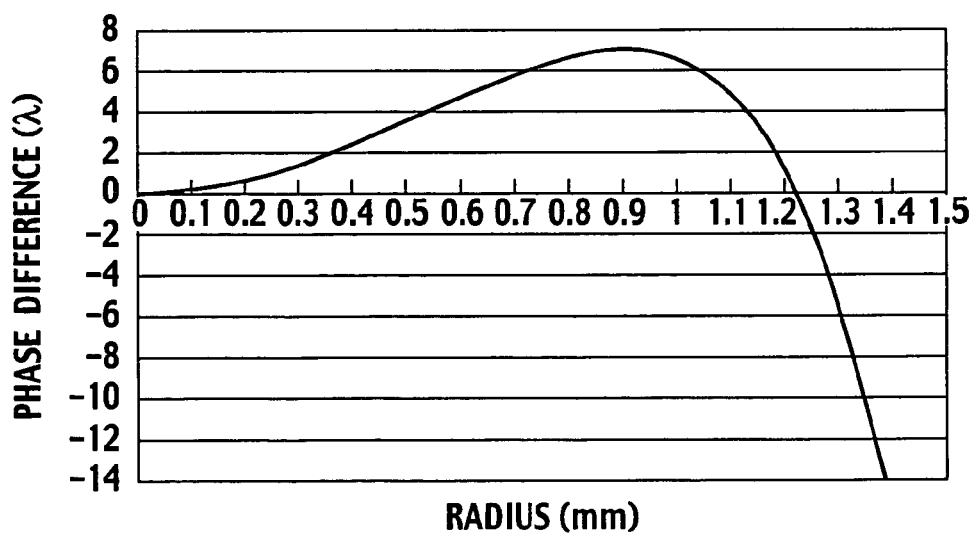
FIG. 8 is a view illustrating an inner circular side phase function curve (a first phase function curve) obtained based on a first phase function Φ(h) used when manufacturing an inner circular side tiered phase difference pattern portion of the phase shift element.
Figure 9:
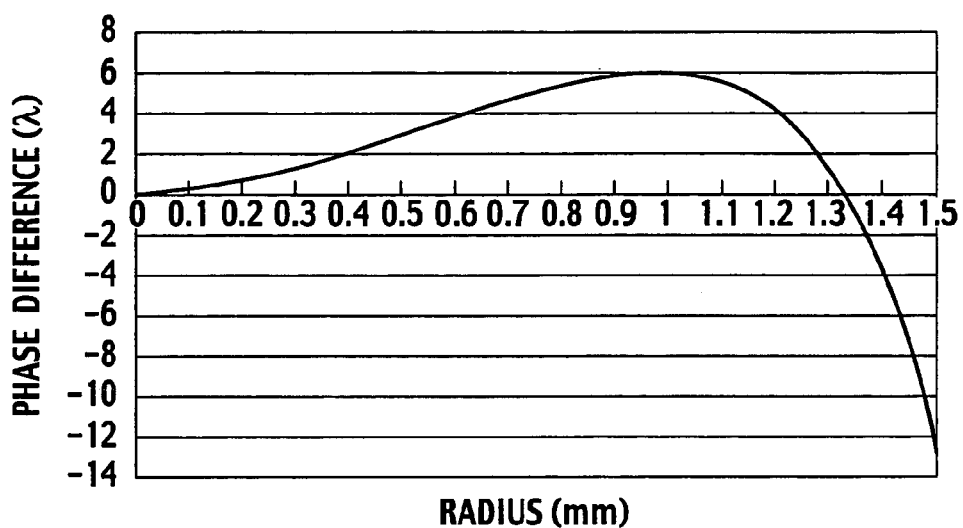
FIG. 9 is a view illustrating an outer circular side phase function curve (a second phase function curve) obtained based on a second phase function Φ'(h) used when manufacturing the phase shift element.
Figure 10:
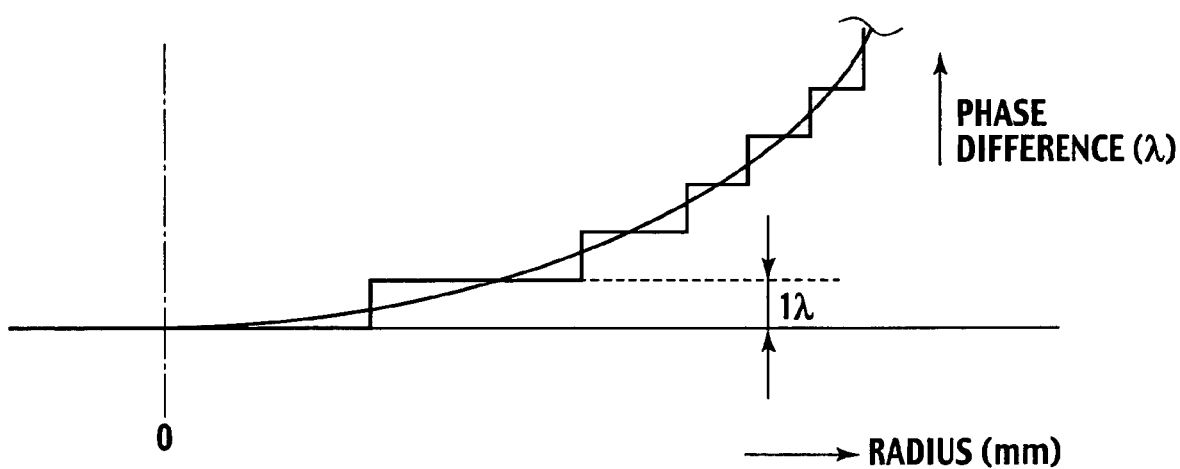
FIG. 10 is a view illustrating a state of forming the inner circular side tiered phase difference pattern portion (or the outer circular side tiered phase difference pattern portion) of the phase shift element based on the inner circular side phase function curve (or the outer circular side phase function curve) obtained in FIG. 8 (or FIG. 9)
Figure 11:
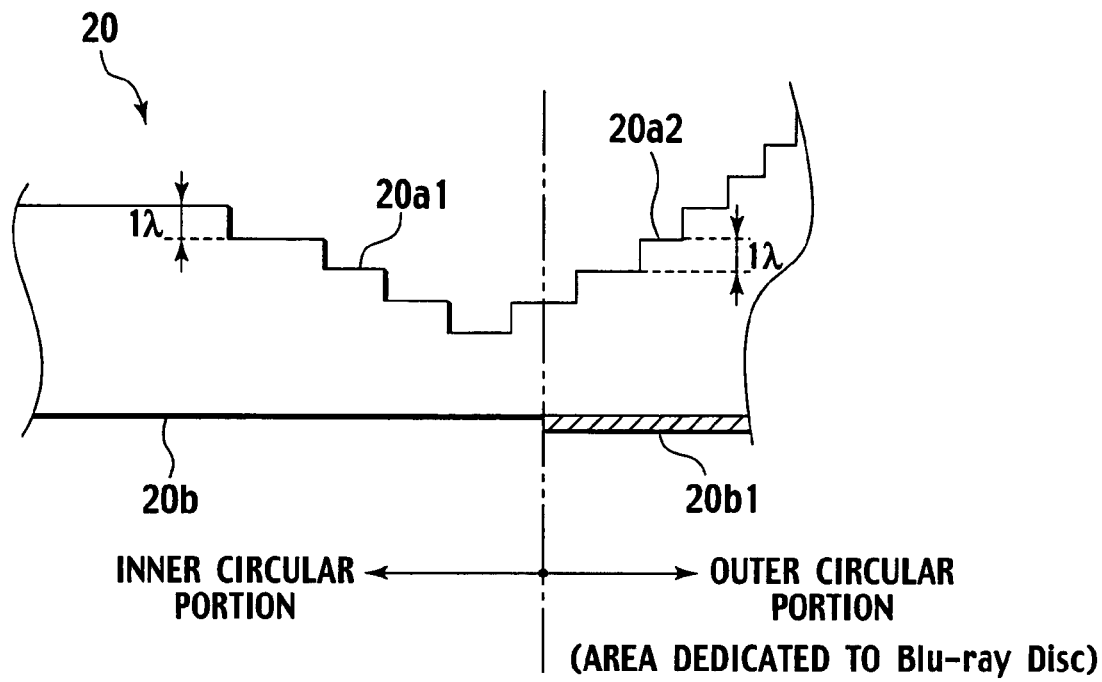
FIG. 11 is a view schematically showing an example where a tier pitch of the tiers of the inner circular side tiered phase difference pattern portion and a tier pitch of the tiers of the outer circular side tiered phase difference pattern portion of the phase shift element are both set to a height corresponding to a phase difference of approximately 1λ.
Figure 12:
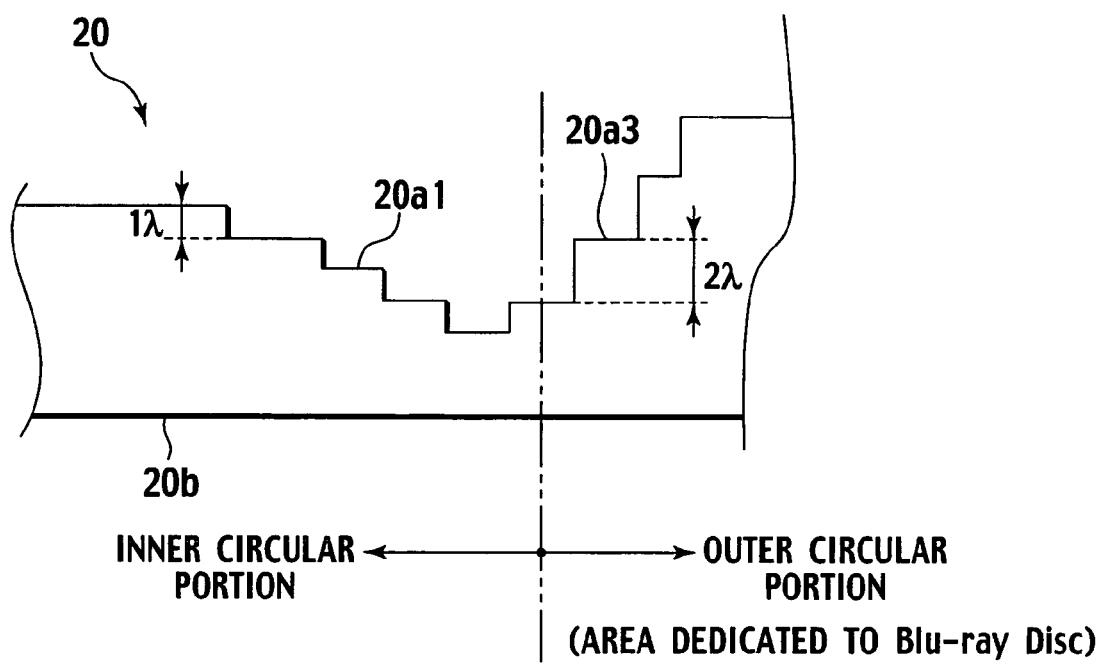
FIG. 12 is a view schematically showing an example where the tier pitch of the tiers of the inner circular side tiered phase difference pattern portion of the phase shift element is set to a height corresponding to a phase difference of approximately 1λ and the tier pitch of the tiers of the outer circular side tiered phase difference pattern portion of the same is set to a height corresponding to a phase difference of approximately 2λ.
Figure 13:
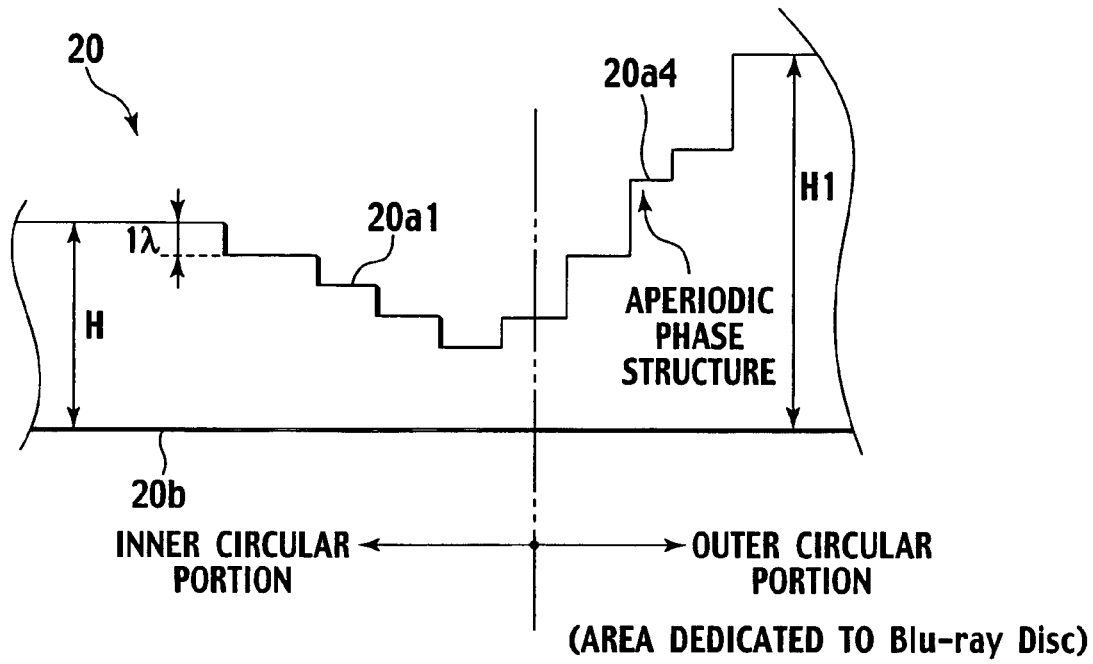
FIG. 13 is a view schematically showing an example where the tier pitch of the tiers of the inner circular side tiered phase difference pattern portion of the phase shift element is set to a height corresponding to a phase difference of approximately 1λ and the tier pitch of the tiers of the outer circular side tiered phase difference pattern portion of the same is formed in an a periodic phase structure.
Figure 14:
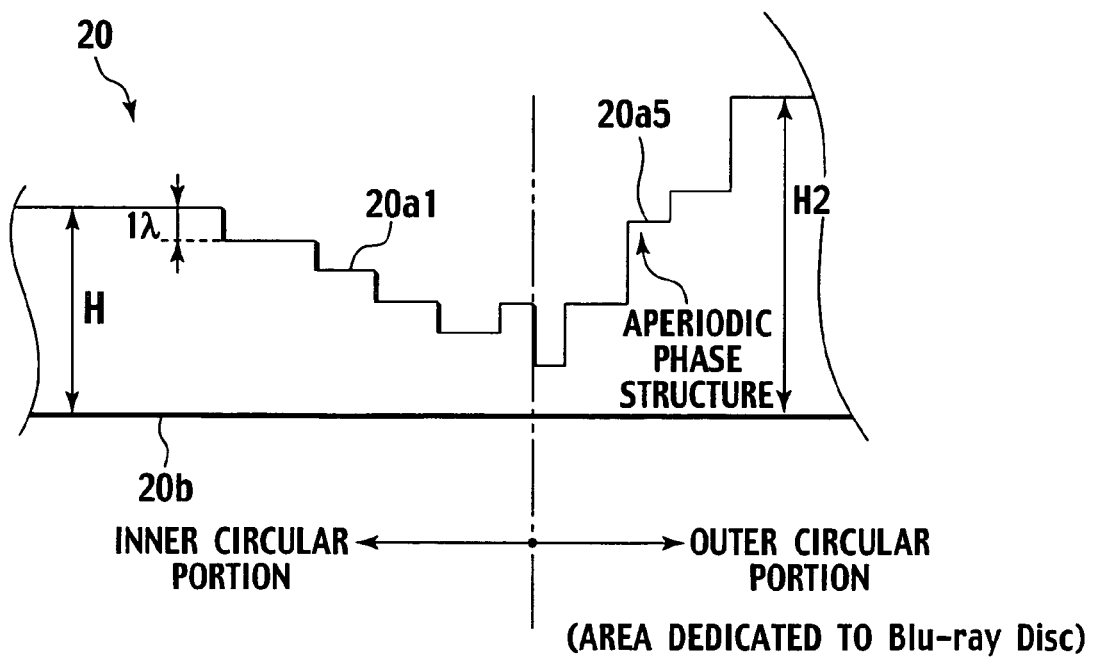
FIG. 14 is a view schematically showing an example where an overall height of the outer circular side tiered phase difference pattern portion is set lower than the phase shift element depicted in FIG. 13.
Figure 15:
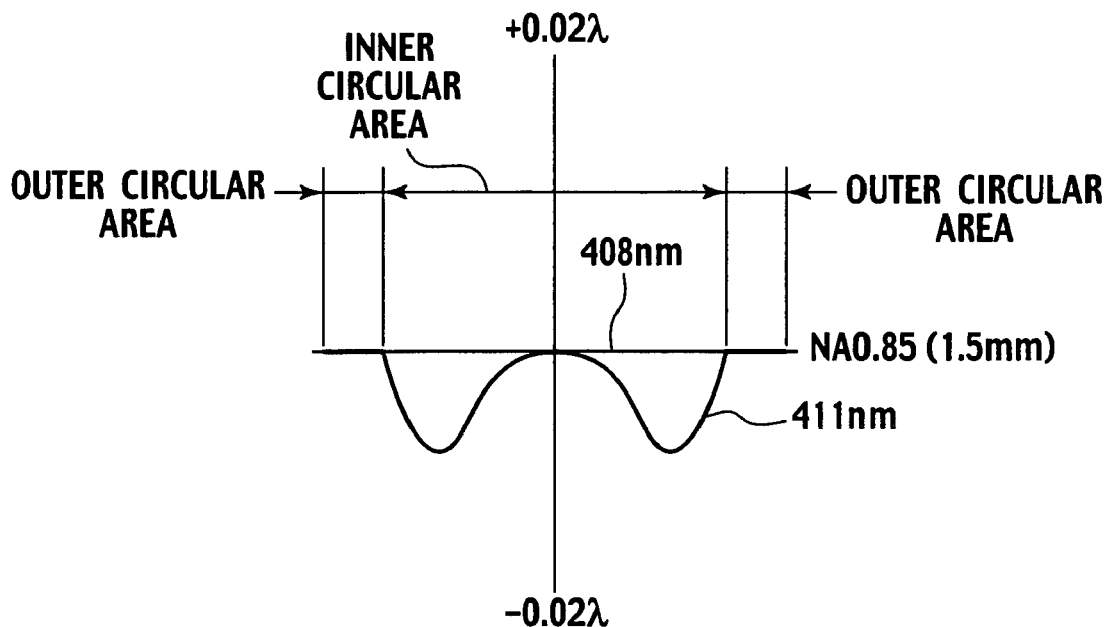
FIG. 15 is a wavefront aberration view in a Blu-ray Disc when the phase shift element depicted in FIG. 13 is used.
Figure 16:
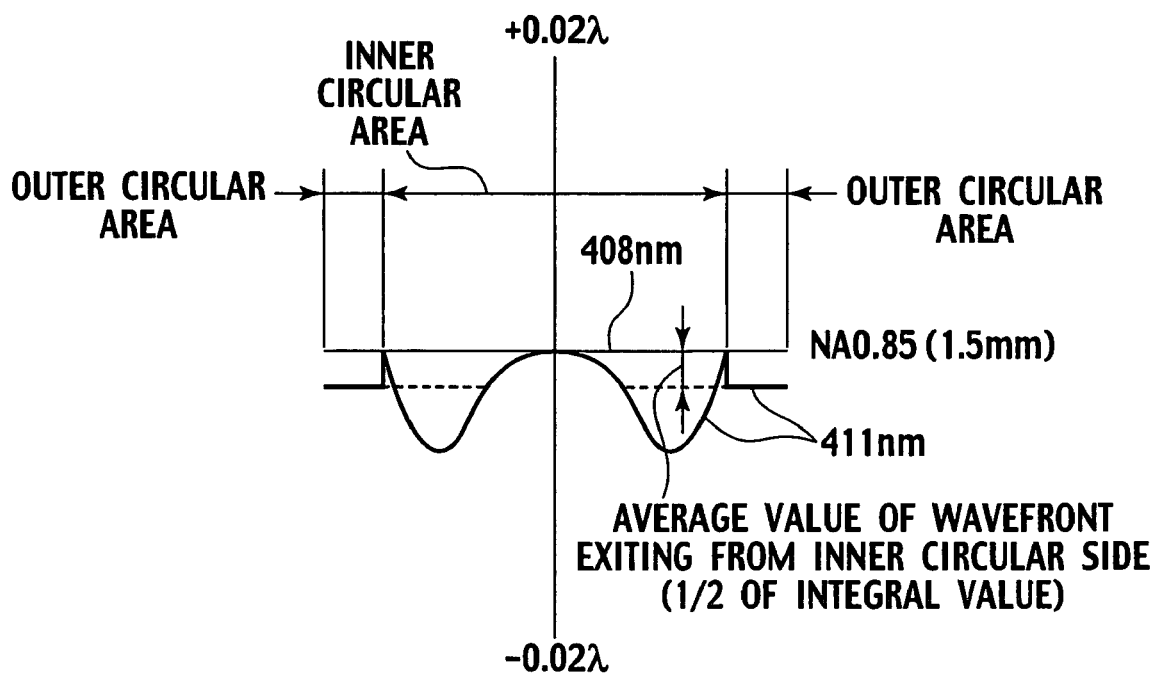
FIG. 16 is a wavefront aberration view in the Blu-ray Disc when the phase shift element depicted in FIG. 14 is used.

FIG. 7 is a vertical cross-sectional view showing in an enlarged manner the phase shift element depicted in FIG. 6. FIG. 8 is a view illustrating the inner circular side phase function curve (the first phase function curve) obtained based on the first phase function Φ(h) used when manufacturing the inner circular side tiered phase difference pattern portion of the phase shift element. FIG. 9 is a view illustrating the outer circular side phase function curve (the second phase function curve) obtained based on the second phase function Φ'(h) used when manufacturing the phase shift element. FIG. 10 is a view illustrating a state of forming the inner circular side tiered phase difference pattern portion (or the outer circular side tiered phase difference pattern portion) of the phase shift element based on the inner circular side phase function curve (or the outer circular side phase function curve) obtained in FIG. 8 (or FIG. 9). FIG. 11 is a view schematically showing an example where a tier pitch of tiers of the inner circular side tiered phase difference pattern portion and a tier pitch of tiers of the outer circular side tiered phase difference pattern portion of the phase shift element are both set to a height corresponding to a phase difference of approximately 1λ. FIG. 12 is a view schematically showing an example where the tier pitch of the tiers of the inner circular side tiered phase difference pattern portion of the phase shift element is set to a height corresponding to the phase difference of approximately 1λ and the tier pitch of the tiers of the outer circular side tiered phase difference pattern portion of the same is set to a height corresponding to a phase difference of approximately 2λ. FIG. 13 is a view schematically showing an example where the tier pitch of the tiers of the inner circular side tiered phase difference pattern portion of the phase shift element is set to a height corresponding to the phase difference of approximately 1λ, and the tier pitch of the tiers of the outer circular side tiered phase difference pattern portion of the same is formed in an aperiodic phase structure. FIG. 14 is a view schematically showing an example where the tier pitch of the tiers of the inner circular side tiered phase difference pattern portion of the phase shift element is set to a height corresponding to the phase difference of approximately 1λ, and the tier pitch of the tiers of the outer circular side tiered phase difference pattern portion is formed in the aperiodic phase structure and an overall height of the outer circular side tiered phase difference pattern portion is set lower than that in the example depicted in FIG. 13. FIG. 15 is a wavefront aberration view in the Blu-ray Disc when the phase shift element depicted in FIG. 13 is used. FIG. 16 is a wavefront aberration view in the Blu-ray Disc when the phase shift element depicted in FIG. 14 is used.

First, the chromatic aberration correction element 17 is arranged in the optical system only which records or reproduces information to or from the Blu-ray Disc 1. When forming the chromatic aberration correction element 17 by attaching the concave lens 17A, the convex lens 17B and the concave lens 17C, a radius of the attached surface is set to 4.0 mm as shown in Table 2.

Next, as shown in Table 7, since a wavefront change is generated when the wavelength changes due to a difference between the wavelength of the first laser light L1 for the Blu-ray Disc 1 and the wavelength of the second laser light L2 for the DVD 2, the phase shift element 20 as the primary part in the embodiment corrects a spherical aberration generated due to a difference in substrate thickness between the Blu-ray Disc 1 and the DVD 2 by using this wavefront change.

It is to be noted that the phase shift element 20 depicted in FIG. 7 is manufactured based on the later-described inner circular side phase function curve (the first phase function curve) and outer circular side phase function curve (the second phase function curve) shown in FIGS. 8 and 9, but the concept is illustrated, and the number of tiers, a relationship in tiers between the inner circular portion and the outer circular portion, a pitch of the circular zone and others are not precisely illustrated but conceptually shown.

In particular, the phase shift element 20 mentioned above is designed in such a manner that a wavefront change is not generated with the first laser light L1 having the reference wavelength λ1 (408 nm), and characterized in that it is set so that a wavefront change is generated when the wavelengths of the first and second laser lights L1 and L2 vary but a wavefront change in the outer circular area has an optimum relationship with respect to a wavefront change in the inner circular area.

Giving a more concrete description, the phase shift element 20 is integrally formed by using transparent BK7 (borosilicate crown glass) having the optical transparency, a quartz substrate or a transparent resin, and BK7 (borosilicate crown glass) is used in this embodiment as shown in Table 2.

Additionally, in the phase shift element 20, the inner circular side tiered phase difference pattern portion 20a1 is formed in annular shapes (ring shapes) within an inner circular portion diameter φD1 while centering on the center "0" on the upper surface (one surface) side facing the objective lens 21 (FIG. 6), and the outer circular side tiered phase difference pattern portion 20a2 is formed in an annular shape (a ring shape) within at least an outer circular portion diameter φD2 outside the inner circular side tiered phase difference pattern portion 20a1. Therefore, a spherical aberration can be corrected with respect to the second laser light L2 for the DVD by the inner circular side tiered phase difference pattern portion 20a1, and a chromatic aberration can be corrected with respect to the first laser light L1 for the Blu-ray Disc by the outer circular side tiered phase difference pattern portion 20a2. In this example, the inner circular portion diameter φD1 with which the inner circular side tiered phase shift pattern portion 20a1 is formed is set to φ2.2 mm, whilst the outer circular portion diameter φD2 with which the outer circular side tiered phase difference pattern portion 20a2 is formed is set to φ3.0 mm, and a pupil diameter of the objective lens 21 (FIG. 6) is φ3.0 mm as shown in Table 1. Therefore, the entire surface of this pupil diameter can be covered.

In this example, as to the inner circular side tiered phase difference pattern portion 20a1 formed in the inner circular area of the phase shift element 20, a wavelength having the same value (408 nm) as the reference wavelength λ1 of the first laser light L1 is determined as the designed wavelength λ, the phase function coefficients $A_2$ to $A_8$ of the second to eighth orders shown in Table 4 are substituted in the first phase function Φ(h) shown in Expression (1) in order to obtain the inner circular side phase function curve (the first phase function curve) shown in FIG. 8, and the inner circular side tiered phase difference pattern portion 20a1 is formed based on the curve whose radius is 1.1 mm or smaller in the inner circular side phase function curve. The center "0" part is set to the upper tier of the tiers, and the tiers protrude toward the objective lens 21 (FIG. 6) side and are gradually lowered toward the inner circular portion diameter φD1 from the center "0".

On the other hand, as to the outer circular side tiered phase difference pattern portion 20a2 formed on the periphery of the phase shift element 20, a wavelength having the same value (408 nm) as the reference wavelength λ1 of the first laser light L1 is determined as the designed wavelength λ, the phase function coefficients $A'_2$ to $A'_8$ of the second to eighth orders shown in Table 5 are substituted in the second phase function Φ'(h) shown in Expression (2) in order to obtain the outer circular side phase function curve (the second phase function curve) shown in FIG. 9, an the outer circular side tiered phase difference pattern portion 20a2 is formed based on the curve whose radius is 1.1 mm or greater in the outer circular side phase function curve. Since the phase function curve is different from that of the lower tier part of the inner circular side tiered phase difference pattern portion 20a1, these pattern portions are separated from each other in terms of the curves, but they are structurally connected with each other. The tiers gradually ascend toward the upper part from the lower tier part of the inner circular side tiered phase difference pattern portion 20a1, and are formed to the outer side of the outer circular portion diameter φD2. It is to be noted that a relationship of descent or ascent described here is dependent on the design of the phase shift element 20, and it may include ascent on the inner circular side or both descent and ascent depending on designs.

A unit of each of the first and second phase functions Φ(h) and Φ'(h) is radian. The inner circular side phase function curve (the first phase function curve) and the outer circular side phase function curve (the second phase function curve) obtained based on these first and second phase functions Φ(h) and Φ'(h) are divided in accordance with each 2π radian as shown in FIG. 9, and each divided value is determined as one unit in order to obtain a tiered structure.

As a result, the concrete shapes of the inner circular side tiered phase difference pattern portion 20a1 and the outer circular side tiered phase difference pattern portion 20a2 of the phase shift element 20 are determined. In this example, the phase difference of the tiers is set to be a substantially integral multiple of the reference wavelength λ1 of the first laser light L1 for the Blu-ray Disc 1. In this case, in each of FIGS. 8 and 9, a horizontal axis represents a radius (mm) equivalent to a height h from the optical axis of the phase shift element 20, and a vertical axis represents a phase difference (λ). Here, as to the phase difference represented by the vertical axis, 2π radian is determined as one wavelength (1λ). It is to be noted that one wavelength (1λ) is determined as a unit in order to simplify the following description.

Furthermore, when manufacturing the phase shift element 20 based on the inner circular side phase function curve and the outer circular side phase function curve shown in FIGS. 8 and 9, as shown in FIG. 10 in the enlarged manner, tier pitches of the tiers are set with a phase difference width which is previously set based on the inner circular side phase function curve and the outer circular side phase function curve in such a manner that a value of the continuous smooth phase function curve is approximated to a discrete value.

That is, in the phase shift element 20, the actual shape of each of the inner circular side tiered phase difference pattern portion 20a1 and the outer circular side tiered phase difference pattern portion 20a2 is a discrete tiered shape with a phase difference width which is substantially 2mπ (a substantially integral multiple of the designed wavelength λ) where m is a natural number which does not include 0, in each of the first and second phase difference functions Φ(h) and Φ'(h). As a result, the tier pitch of the tiers is equivalent to a height that a difference in optical path length is substantially m-fold of the designed wavelength λ (408 nm). By doing so, with the wavelength (substantially mλ) which is substantially m-fold of the designed wavelength λ, no change is substantially generated in the wavefront with respect to the first laser light L1 which has been transmitted through the inner circular side tiered phase difference pattern portion 20a1 and the outer circular side tiered phase difference pattern portion 20a2 of the phase shift element 20 and whose reference wavelength λ1 is 408 nm. When the wavelength of the first laser light L1 is changed, a wavefront change according to a phase structure is generated.

FIG. 10 shows the example where the preset phase difference width is set to substantially one wavelength (substantially 1λ) of the designed wavelength λ and divided into tiers.

At this time, an error between a value of the continuous smooth phase function curve and a discrete value approximating the former value (which can be a quantization error) is an error of the wavefront, and mainly becomes a diffraction loss. Specifically, although the light transmittance is reduced in some measure, a range of changes in wavelength is small in the vicinity of the reference wavelength λ1 of the first laser light L1 for to the Blu-ray Disc 1. Therefore, this reduction is small and does not practically become a problem. On the other hand, in case of the DVD 2, although a diffraction loss of several-ten % order is generated in terms of a light quantity, the range of changes can be sufficiently compensated by design considering this diffraction loss.

Furthermore, as shown in FIG. 11, in the phase shift element 20, when a tier pitch of the tiers of the inner circular side tiered phase difference pattern portion 20a1 formed in the inner circular portion and a tier pitch of the tiers of the outer circular side tiered phase difference pattern portion 20a2 formed in the outer circular portion are both set to a height corresponding to a phase difference of substantially one wavelength (substantially 1λ) of the designed wavelength λ, the phase shift element 20 has a phase structure of the first order.

Additionally, when the tier pitch of the inner circular side tiered phase difference pattern portion 20a1 and the tier pitch of the outer circular side tiered phase difference pattern portion 20a2 in the phase shift element 20 are both set to a height corresponding to the phase difference of substantially one wavelength (substantially 1λ) of the designed wavelength λ, as shown in FIGS. 7 and 11, a second laser aperture limiting portion 20b1 which limits the second leaser light L2 so that the numerical aperture (NA) into the objective lens 21 becomes 0.6 with respect to the second laser light L2 is formed in an annular shape in the outer circular portion of the undersurface 20b facing the outer circular side tiered phase difference pattern portion 20a2 by using a dichroic film.

At this time, the second laser light aperture limiting portion 20b1 formed to the undersurface 20b (the other surface) of the phase shift element 20 has characteristics which transmit the first laser light L1 with the reference wavelength λ1=408 nm±8 nm exiting from the blue semiconductor laser 11 (FIG. 6) therethrough and prevent transmission of the second laser light L2 with the reference wavelength λ2=655 nm±10 nm exiting from the red semiconductor laser 31 (FIG. 6) by the dichroic film having the wavelength selectivity.

Therefore, the first laser light L1 for the Blu-ray Disc 1 is transmitted through the inner circular side tiered phase difference pattern portion 20a1 and the outer circular side tiered phase difference pattern portion 20a2 of the phase shift element 20 and, on the other hand, the second laser light for the DVD 2 is transmitted through the inner circular side tiered phase difference pattern portion 20a1 only and prevented from being transmitted by the outer circular side tiered phase difference pattern portion 20a2. Therefore, the outer circular side tiered phase difference pattern portion 20a is an area dedicated to the Blu-ray Disc.

Meanwhile, the outer circular side of the phase shift element 20 which does not need to take a spherical aberration into consideration with respect to the DVD 2 has no restriction in orders of the phase structure and, as shown in FIG. 12, the tier pitch of the tiers of the outer circular side tiered phase difference pattern portion 20a3 of the phase shift element 20 is set to, e.g., a height corresponding to the phase difference of a wavelength which is substantially two-fold (substantially 2λ) of the designed wavelength λ. However, the present invention is not restricted thereto, and the tier pitch may be set to a height corresponding to a phase difference of a wavelength which is substantially m-fold (substantially mλ) (where m is a natural number which does not include 0) of the designed wavelength λ. The thus formed phase shift element 20 is called a phase structure of a higher order (second order or above).

Further, as shown in FIG. 13, the tier pitch of the tiers of the outer circular side tiered phase difference pattern portion 20a4 of the phase shift element 20 may be set to a height corresponding to the phase difference of substantially mλ while varying a value of m (where m is a natural number which does not include 0) in accordance with each tier in the step structure. The thus formed phase shift element 20 is called an aperiodic phase structure.

In the example of the phase shift element 20 shown in FIG. 13, as the aperiodic phase structure in the outer circular side tiered phase difference pattern portion 20a4, a space between the first tier and the second tier of the outer circular side tiered phase difference pattern portion 20a4 is set to 2λ; a space between the second tier and the third tier of the same is also set to 2λ; a space between the third tier and the fourth tier of the same is set to 1λ; and a space between the fourth tier and the fifth tier of the same is set to 3λ, for example.

Meanwhile, a wavefront aberration of the optical system using the phase shift element shown in FIGS. 11, 12 and 13 in the Blu-ray Disc having such a structure can be obtained as shown in FIG. 15.

As apparent from the wavefront aberration view shown in FIG. 15, a wavefront aberration is not generated at all in both the inner circular area and the outer circular area with respect to the reference wavelength λ1 (408 nm) of the first laser light L1, but the wavelength of the first laser light L1 has irregularities, and a wavefront aberration is generated with respect to the first laser light L1 whose wavelength is, e.g., 411 nm. In this case, since a wavefront aberration value of the first laser light L1 whose wavelength is 411 nm exiting from the outer circular side tiered phase difference pattern portion 20a4 is 0 with respect to an average value obtained by integrating and averaging a wavefront aberration value of the first laser light L1 whose wavelength is 411 nm exiting from the inner circular side tiered phase difference pattern portion 20a1, a phase difference appears in a value of the average wavefront between the inner circular area and the outer circular area.

Thus, an offset is given between an overall height of the outer circular side tiered phase difference pattern portion of the phase shift element 20 and an overall height of the inner circular side tiered phase difference pattern portion of the same by adding to the second phase function Φ'(h) for the outer circular side a phase difference which is close to an average value of the wavefront generated by the first phase function Φ(h) for the inner circular side and is a substantially integral multiple of the designed wavelength λ. Based on this, a phase difference between an average wavefront of the light exiting from the inner circular side tiered phase difference pattern portion and an wavefront of the light exiting from the outer circular side tiered phase difference pattern portion when the wavelength changes in the vicinity of the reference wavelength of the first laser light L1 is reduced, thereby decreasing a wavefront aberration quantity. In this example, since the phase difference given as the offset is determined as a phase difference which is a substantially integral multiple of the designed wavelength λ, there is no influence of this operation in the reference wavelength λ of the first laser light L1. Further, there is no influence on a light ray aberration shown in the longitudinal aberration view.

This will now be described with reference to FIG. 14. In FIG. 14, the above-described operation is performed with respect to the phase shift element 20 depicted in FIG. 13. The structures of the respective phase shift elements 20 on the inner circular side shown in FIGS. 13 and 14 are equal to each other, and the inner circular side tiered phase difference pattern portion 20a1 has the same overall height H with the undersurface 20b determined as a reference and the same tier shape.

On the other hand, as shown in FIG. 14, an overall height H2 of the outer circular side tiered phase difference pattern portion 20a5 of the phase shift element 20 is set lower than an overall height H1 of the outer circular side tiered phase difference pattern portion 20a4 of the phase shift element 20 depicted in FIG. 13. Therefore, a value of H2 is smaller than a value of H1. In this example, a phase difference given as the offset is generated due to a difference between the heights H1 and H2. Here, an aberration in the reference wavelength λ1 of the first laser light L1 can be prevented from being generated by determining this phase difference as a substantially integral multiple of the designed wavelength λ.

FIG. 16 shows a state of the wavefront aberration of the optical system using the phase shift element 20 depicted in FIG. 14.

As apparent from the wavefront aberration view depicted in FIG. 16, by setting the overall height H2 of the outer circular side tiered phase difference pattern portion 20a5 with respect to the overall height H of the inner circular side tiered phase difference pattern portion 20a1 to be lower than the overall height H1 shown in FIG. 13, a value close to the average value obtained by integrating and averaging the wavefront aberration value of the first laser light L1 whose wavelength is 411 nm exiting from the inner circular side tiered phase difference pattern portion 20a1 can be acquired as the wavefront aberration value of the first laser light L1 whose wavelength is 411 nm exiting from the outer circular side tiered phase difference pattern portion 20a5. Therefore, the wavefront aberration value of the inner circular area becomes substantially equal to that of the outer circular area. In other words, the overall height H2 of the outer circular side tiered phase difference pattern portion 20a5 of the phase shift element 20 is set with respect to the overall height H of the inner circular side tiered phase difference pattern portion 20a1 of the same so that the wavefront aberration value which is close to the average value obtained by integrating and averaging the wavefront aberration value of the first laser light L1 exiting from the inner circular side tiered phase difference pattern portion 20a1 can be acquired. As a result, the wavefront aberrations of both the inner circular area and the outer circular area can be improved with respect to the first laser light L1 in the phase shift element 20.

In this case, both the phase shift element 20 having the shape shown in FIG. 13 and the phase shift element 20 having the shape depicted in FIG. 14 have the same characteristics of the inner circular side longitudinal aberration and the outer circular side longitudinal aberration in the Blu-ray Disc, and the inner circular side longitudinal aberration view and the outer circular side longitudinal aberration view in the Blu-ray Disc with respect to the phase shift element 20 will be described later.

Of course, as described above, the reference wavelength λ1 (408 nm) of the first laser light L1 has wavelength irregularities, and a technical concept for forming the outer circular side tiered phase difference pattern portion of the phase shift element 20 so that the inner circular area and the outer circular area have substantially the same wavefront aberration value with respect to the first laser light L1 whose wavelength is, e.g., 411 nm can be also applied to the phase shift element 20 having the shape shown in FIG. 12 or the phase shift element 20 having the shape depicted in FIG. 13.

Additionally, as described above, when the outer circular side of the phase shift element 20 takes such a phase structure of a higher degree (a second order or above) as shown in FIG. 12 or such an aperiodic phase structure as shown in FIGS. 13 and 14, an annular zone pitch of the tiers in the outer circular side phase structure can be set large, and there is a merit that production of the phase shift element 20 can be facilitated.

Furthermore, when the outer circular side of the phase shift element 20 takes such a phase structure of a higher order (a second order or above) as shown in FIG. 12 or such an aperiodic phase structure as shown in FIGS. 13 and 14, there is a merit that light beams only which are required for reproduction of information of the DVD on the inner side can be separated without providing the second laser light aperture limiting portion or the like having the wavelength selectivity with respect to the second laser light L2 on the outer circular side which is an unnecessary light for the DVD 2. That is because a difference in degrees in the phase structure means a difference in orders of the diffraction effect generated by the phase structure, the continuity of the wavefront is disrupted at the boundary between the inner and outer circular portions due to this difference, and a light beam on the outer circular side is separated from a light beam on the inner circular side, which does not affect a spot on the DVD 2 formed by the light beam on the inner circular side.

Moreover, when the phase shift element 20 takes the phase structure of a higher order, the fact that the diffraction efficiency is often reduced in the vicinity of a wavelength of 650 nm is one factor enabling separation of the light beams. On the other hand, in the phase structure of the first order, as shown in FIGS. 7 and 11, provision of the second laser light aperture limiting portion 20b1 which prevents transmission of the second laser light L2 for the DVD 2 on the outer circular side can improve recording characteristics or reproduction characteristics for the DVD 2.

It is to be noted that provision of the second laser light aperture limiting portion 20b1 which prevents transmission of the second laser light L2 for the DVD 2 on the outer circular side of the undersurface 20b of the phase shift element 20 can of course reduce the degree of influence of the light on the periphery and improve the recording characteristics or the reproduction characteristics for the DVD 2 even in case of the phase structure of a higher order (a second order or above) or the aperiodic phase structure.

Here, again referring to FIG. 6, the objective lens 21 which is the primary part in the embodiment is designed for the Blu-ray Disc, the surface 21a facing the phase shift element 20 is formed into an aspherical shape and the surface 21b facing the Blu-ray Disc 1 or the DVD 2 is also formed into an aspherical shape by using a glass material, e.g., NBF1 (optical glass manufactured by HOYA) as shown in Table 2.

In this example, a working distance between the surface 21b of the objective lens 21 and the laser bean incidence surface 1a of the Blu-ray Disc 1 is approximately 0.40 mm as shown in Table 2, and a working distance between the surface 21b of the objective lens 21 and the laser beam incidence surface 2a of the DVD 2 is approximately 0.16 mm as shown in Table 2.

Additionally, as the objective lens 21 optimally designed in an infinitely conjugated state so that information is recorded or reproduced onto or from the Blu-ray Disc 1 by using the first laser light L1 whose reference wavelength λ1 is 408 nm, there is used an objective lens in which the reference wavelength λ1 of the first laser light L1 exiting from the blue semiconductor laser 22 (FIG. 6) is set to, e.g., 408 nm, the numerical aperture (NA) is 0.85, the focal distance is 1.7647 mm and the pupil incidence diameter (a pupil diameter) is 3.0 mm.

An operation when the optical system in the embodiment is used will now be described.

Figure 17:
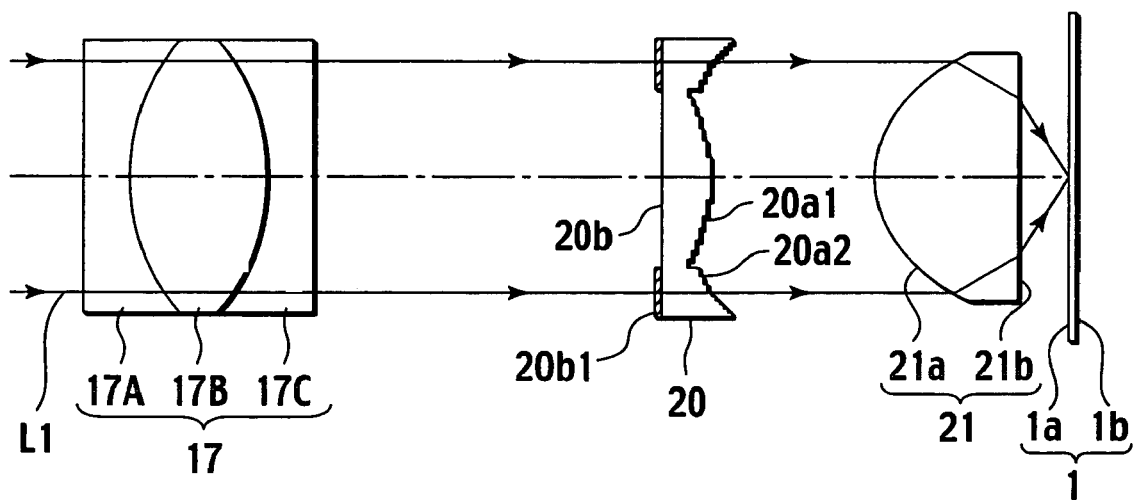
FIG. 17 is a light path view in the Blu-ray Disc.
Figure 18:
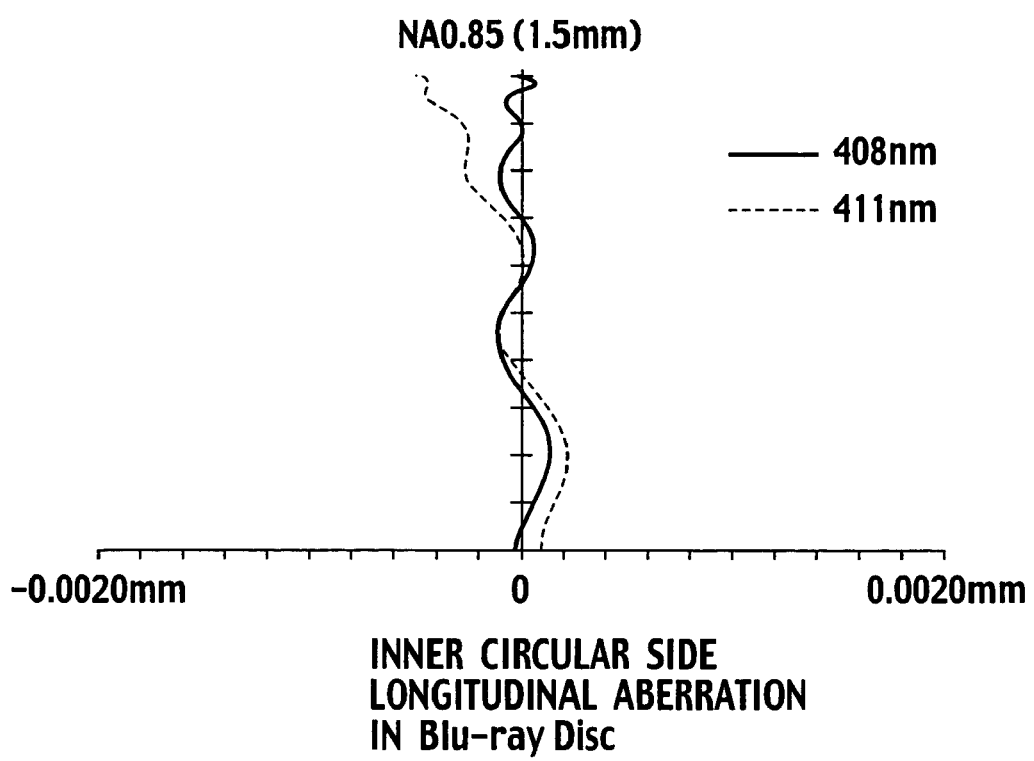
FIG. 18 is an inner circular side longitudinal aberration view in the Blu-ray Disc.
Figure 19:
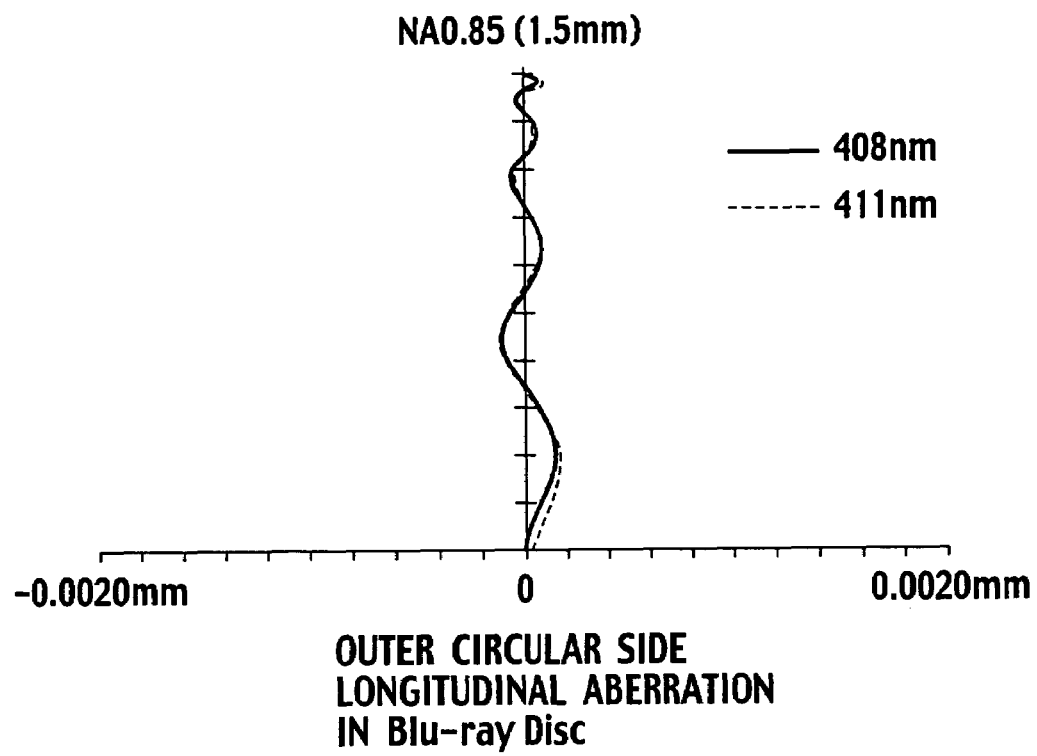
FIG. 19 is an outer circular side longitudinal aberration view in the Blu-ray Disc.
Figure 20:
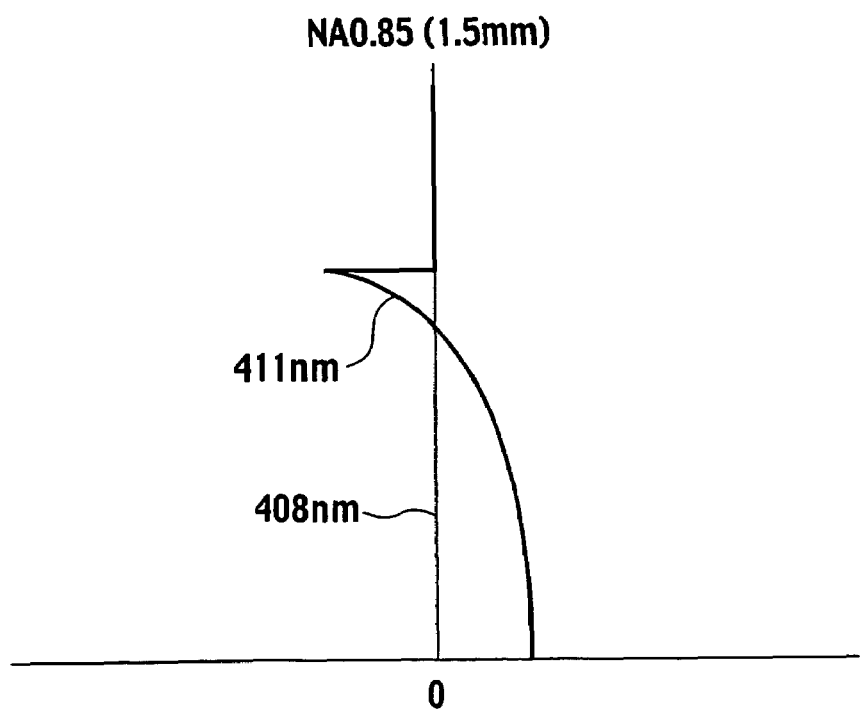
FIG. 20 is a longitudinal aberration view in which an inner circular side longitudinal aberration and an outer circular side longitudinal aberration in the Blu-ray Disc are combined.
Figure 21:
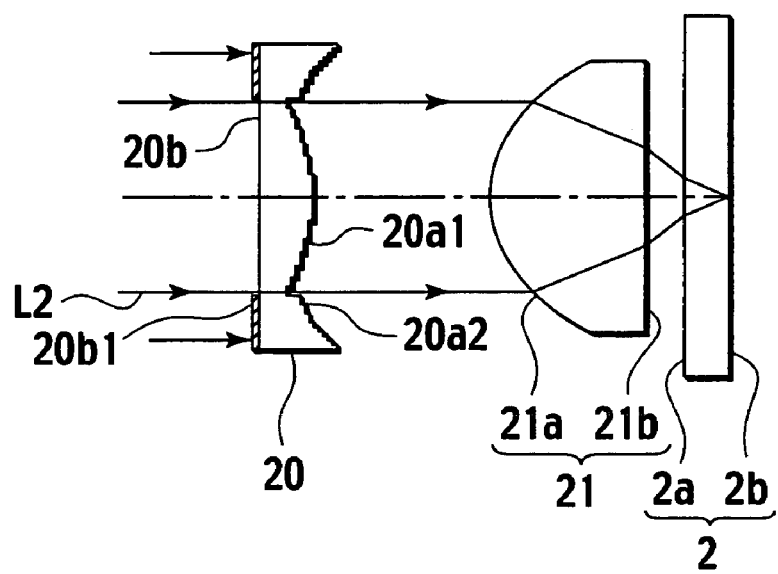
FIG. 21 is a light path view in a DVD.
Figure 22:
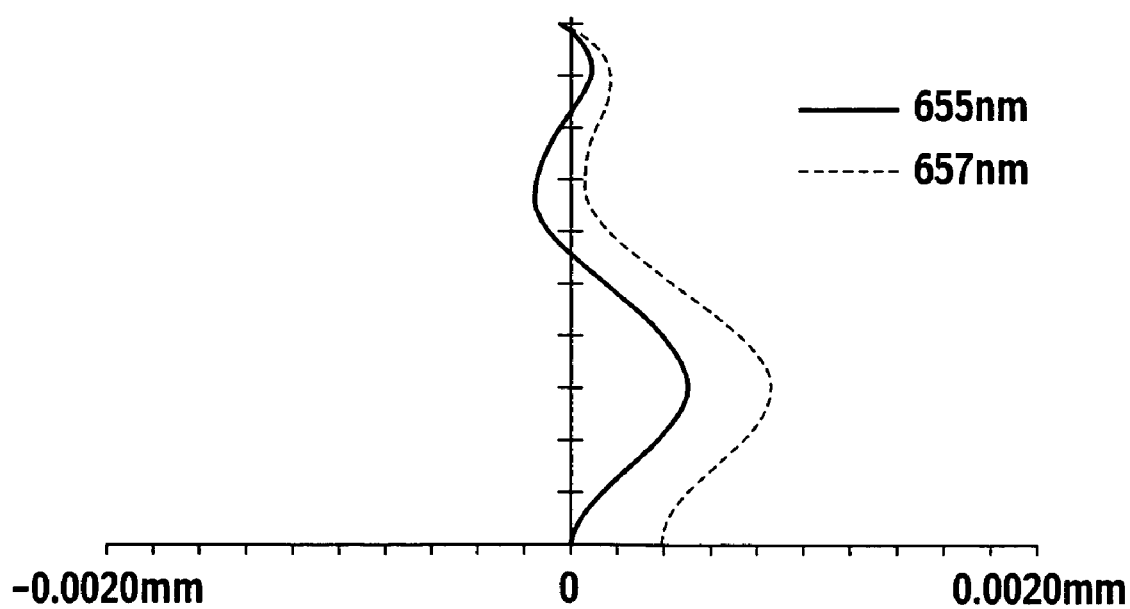
FIG. 22 is a longitudinal aberration view in the DVD.

FIG. 17 is an optical path view in the Blu-ray Disc. FIG. 18 is an inner circular side longitudinal aberration view in the Blu-ray Disc. FIG. 19 is an outer circular side longitudinal aberration view in the Blu-ray Disc. FIG. 20 is a longitudinal aberration view in which an inner circular side longitudinal aberration is combined with an outer circular side longitudinal aberration in the Blu-ray Disc. FIG. 21 is an optical path view in the DVD. FIG. 22 is a longitudinal aberration view in the DVD.

First, FIG. 17 shows the optical path view in the Blu-ray Disc, FIG. 18 shows the inner circular side longitudinal aberration view in the Blu-ray Disc, FIG. 19 shows the outer circular side longitudinal aberration view and FIG. 20 shows the longitudinal aberration view in which an inner circular side longitudinal aberration is combined with an outer circular side longitudinal aberration when recording or reproducing information onto or from the Blu-ray Disc 1 in the embodiment.

That is, in this embodiment, the chromatic aberration correction element 17 formed by attaching the concave lens 17A, the convex lens 17B and the concave lens 17C is arranged on the blue semiconductor laser 11 (FIG. 6) side when recording or reproducing information onto or from the Blu-ray Disc 1 by the optical system shown in FIG. 17.

Further, the first laser light L1 exiting from the blue semiconductor laser 11 (FIG. 6) is converted into a parallel light by the collimator lens 14 (FIG. 6), and the parallel light obtained from the first laser light L1 is caused to enter the inner circular area and the outer circular area of the undersurface 20b of the phase shift element 20 through the chromatic aberration correction element 17. In this example, although the second laser light aperture limiting portion 20b1 is formed in a ring-like shape in the outer circular area of the undersurface 20b of the phase shift element 20 by using the dichroic film, the first laser light L1 is transmitted through the inner circular area of the undersurface 20b and the second laser aperture limiting portion 20b1 as it is, then transmitted through the inner circular side tiered phase difference pattern portion 20a1 and the outer circular side tiered phase difference pattern portion 20a2 as it is, and caused to enter the surface 21a of the objective lens 21 while remaining as the parallel light.

At this time, since the tier pitch of each of the inner circular side tiered phase difference pattern portion 20a1 and the outer circular side tiered phase difference pattern portion 20a2 of the phase shift element 20 is set to a height corresponding to the phase difference of substantially one wavelength (substantially $1\lambda$) of the designed wavelength $\lambda$ as described above with reference to FIG. 11, there occurs no change in the wavefront with respect to the first laser light L1 whose reference wavelength $\lambda 1$ is 408 nm.

It is to be noted that such a phase structure of a higher order (a second order or a higher order) as shown in FIG. 12 or such an aperiodic phase structure as shown in FIGS. 13 and 14 can be also adopted as the phase shift element 20 and, in such a case, a difference lies in that the second laser light aperture limiting portion is not provided on the undersurface 20b.

Furthermore, the first laser beam narrowed down by the objective lens 21 is caused to enter from the laser beam incidence surface 1a of the Blu-ray Disc 1 and condensed on the signal surface 1b having the disc substrate thickness of 0.1 mm.

Moreover, as apparent from the inner circular side longitudinal aberration view in the Blu-ray Disc depicted in FIG. 18 and the outer circular side longitudinal aberration view in the Blu-ray Disc shown in FIG. 19, since a level of influence of a spherical aberration is as small as substantially zero with respect to the reference wavelength $\lambda 1$ (408 nm) of the first laser light L1 when recording or reproducing information onto or from the Blu-ray Disc 1, the excellent characteristics can be obtained with respect to the Blu-ray Disc 1. On the other hand, when the first laser light L1 has a wavelength error, a spherical aberration on the inner circular side varies with respect to the wavelength of, e.g., 411 nm, but the phase shift element is designed so that occurrence of the spherical aberration on the outer circular side can be reduced.

Additionally, as shown in FIG. 20, the longitudinal aberration view in which the inner circular side longitudinal aberration is combined with the outer circular side longitudinal aberration in the Blu-ray Disc is not an accurate view for the purpose of facilitating the understanding of advantages of the present invention, but it is schematically drawn on the assumption that there is no undulation of a higher order in the longitudinal aberration mainly generated by the objective lens 21. This is an aberration view as the lens system.

Here, as obvious, when there is a wavelength error, the outer circular side is designed so that all light beams are condensed in the vicinity of the best image surface formed by the light beam on the inner circular side. By doing so, when there is a wavelength error, generation of the aberration as the optical system can be suppressed.

It is to be noted that a difference between the image surface of 408 nm and the best image surface of 411 nm can be suppressed in regard to the inner circular side by appropriately designing the chromatic aberration correction element 17 in this embodiment. On the contrary, the design which prevents the both image surfaces from matching with each other is also possible by performing slightly insufficient chromatic aberration correction or excessive chromatic aberration correction. In this case, as to the design of the outer circular side, an excellent result can be obtained by placing the light beam in the vicinity of either the best image surface of the light beam (411 nm in the example) or the image surface of 408 nm (the reference wavelength), or between these image surfaces when the inner circular side has a wavelength error.

Here, giving a description on an effect of the optical path view in the Blu-ray Disc in the embodiment, a radius of the attached surface obtained when forming the chromatic aberration correction element by attaching the concave lens, the convex lens and the concave lens is 3.8 mm when providing no phase shift element as a comparative example and this radius of 3.8 mm has a very deep shape, and hence it can be said that this is the chromatic aberration correction element which is hard to be produced. Moreover, when the chromatic aberration correction element having the attached surface whose radius is 3.8 mm without the phase shift element is used as a comparative example, a value rms of a wavefront aberration is $0.031\lambda$ when a wavelength of the first laser light L1 is 411 nm.

On the other hand, since the phase shift element 20 is provided in the embodiment, the radius of the attached surface of the chromatic aberration correction element 17 is 4.0 mm as shown in Table 2, and the radius of the attached surface of the chromatic aberration correction element 17 can be alleviated by 5% or more as compared with the comparative example. Therefore, alleviation of the radius of the attached surface of the chromatic aberration correction element 17 described above facilitates production of the chromatic aberration correction element 17, which is very effective. Additionally, in cases where the chromatic aberration correction element 17 having the attached surface whose radius is 4.0 mm with the phase shift element 20 is used, the value rms of the wavefront aberration is $0.003\lambda$ when the wavelength of the first laser light L1 is 411 nm, and the aberration can be suppressed to substantially zero. These numerical values demonstrate the effectivity with respect to the Blu-ray Disc 1.

FIG. 21 shows the optical path view in the DVD and FIG. 22 shows the longitudinal aberration view in the DVD when recording or reproducing information onto or from the DVD 2 in the embodiment.

That is, as shown in FIG. 21, the chromatic aberration element is not arranged on the red semiconductor laser 31 (FIG. 6) side, the second laser light L2 exiting from the red semiconductor laser 31 (FIG. 6) is converted into a parallel light by the collimator lens 34 (FIG. 6), the parallel light obtained from the second laser light L2 is prevented from being transmitted and restricted by the second laser light aperture limiting portion 20b1 formed in the outer circular area of the undersurface 20b of the phase shift element 20 so that a numerical aperture (NA) with respect to the objective lens 21 becomes 0.6, and the parallel light of the second laser light L2 is caused to enter the inner circular area only of the undersurface 20b of the phase shift element 20. Thereafter, a spherical aberration is corrected by the inner circular side tiered phase difference pattern portion 20a1 of the phase shift element 20, and the second laser light L2 is caused to enter the surface 21a of the objective lens 21 in the substantially parallel light state.

Then, the second laser beam narrowed down by the objective lens 21 is caused to enter the laser beam incidence surface 2a of the DVD 2 and condensed on the signal surface 2b having the disc substrate thickness of 0.6 mm.

In this case, since the objective lens 21 is designed for the Blu-ray Disc, a spherical aberration becomes large with respect to the second laser light L2 having the wavelength λ2 of 655 nm exiting from the red semiconductor laser 31 (FIG. 6), but the spherical aberration is corrected by performing the wavefront correction by using the inner circular side tiered phase difference pattern portion 20a1 of the phase shift element 20. Therefore, recording or reproduction of information onto or from the DVD 2 is not obstructed.

Additionally, in the longitudinal aberration view in the DVD depicted in FIG. 22, a ray height of 1.1 mm which is a pupil diameter of the objective lens 21 is shown, and the outer circular area in which a ray height is not less than 1.1 mm is not necessary in the DVD 2. Therefore, there is no problem. Further, a spherical aberration is corrected with respect to the DVD 2 in the inner circular area having the inner circular portion diameter φD1 (FIG. 7) of 2.2 mm or below. Furthermore, although not shown, a value rms of a wavefront aberration is smaller than 0.05λ2 with respect to the DVD 2.

It should be understood that many modifications and adaptations of the invention will become apparent to those skilled in the art and it is intended to encompass such obvious modifications and changes in the scope of the claims appended hereto.

What is claimed is:

1. An optical pickup device which selectively records or reproduces a first optical recording medium, and a second optical recording medium having a recording density lower than that of the first optical recording medium and a substrate thickness larger than that of the first optical recording medium, comprising:
   a first laser light source which emits a first laser light whose wavelength is not more than 450 nm in accordance with the first optical recording medium;
   a second laser light source which emits a second laser light whose wavelength is longer than that of the first laser light in accordance with the second optical recording medium;
   an objective lens which has a numerical aperture (NA) set to 0.75 or above for the first optical recording medium, in which at least one of respective surfaces thereof backing onto each other is formed into an aspherical surface, and which converges the first and second laser lights on the respective signal surfaces of the first and second optical recording mediums; and
   a phase shift element which is provided between the first and second laser light source side and the objective lens and corrects a spherical aberration generated due to a difference in substrate thickness between the first and second optical recording mediums,
   wherein first and second phase function curves are respectively obtained based on first and second phase functions with a wavelength having the same value as a reference wavelength λ1 of the first laser light being determined as a designed wavelength λ, then the phase shift element has an inner circular side tiered phase difference pattern portion formed in annular shapes in an inner circular area of one surface thereof based on the first phase function curve and has an outer circular side tiered phase difference pattern portion formed in annular shapes in an outer circular area outside the inner circular side tiered phase difference pattern portion based on the second phase function curve, and a tier pitch of tiers of the inner circular side tiered phase difference pattern portion is set to a height corresponding to a phase difference of approximately 1λ and, on the other hand, a tier pitch of tiers of the outer circular side tiered phase difference pattern portion is set to a height corresponding to a phase difference of approximately mλ (where m is a natural number which does not include 0) or a height corresponding to a phase difference of approximately mλ by changing a value of m in accordance with each tier.

2. The optical pickup device according to claim 1, wherein an offset is given between an overall height of the outer circular side tiered phase difference pattern portion of the phase shift element and an overall height of the inner circular side tiered phase difference pattern portion of the same by adding to the second phase function a phase difference which is close to an average value of a wavefront generated by the first phase function and which is a substantially integral multiple of the designed wavelength λ, thereby reducing a phase difference between an average wavefront of a light exiting from the inner circular side tiered phase difference pattern portion and a wavefront of a light exiting from the outer circular side tiered phase difference pattern portion when a wavelength changes in the vicinity of the reference wavelength of the first laser light.

3. The optical pickup device according to claim 1, wherein a second laser light aperture limiting portion which limits a numerical aperture (NA) of the second laser light with respect to the objective lens when the tier pitch of the tiers of the outer circular side tiered phase difference pattern portion is set to substantially mλ=substantially 1λ is formed on a reverse side with respect to the outer circular side tiered phase difference pattern portion of the phase shift element.

4. The optical pickup device according to claim 1, further comprising: a chromatic aberration correction element which is arranged between the first laser light source side and the phase shift element and corrects a chromatic aberration.

5. The optical pickup device according to claim 4, wherein the chromatic aberration correction element is arranged to act on the first laser light only.

* * * * *